US007243002B1

(12) United States Patent
Hoganson et al.

(10) Patent No.: US 7,243,002 B1
(45) Date of Patent: Jul. 10, 2007

(54) SYSTEM AND METHOD FOR CARRIER IDENTIFICATION IN A PNEUMATIC TUBE SYSTEM

(75) Inventors: Kenneth Michael Hoganson, Aurora, CO (US); Gregory Richard Chaney, Centennial, CO (US); Bennett Charles Hinnen, Arvada, CO (US)

(73) Assignee: Translogic Corporation, Denver, CO (US)

( * ) Notice: Subject to any disclaimer, the term of this patent is extended or adjusted under 35 U.S.C. 154(b) by 66 days.

(21) Appl. No.: 10/991,303

(22) Filed: Nov. 17, 2004

(51) Int. Cl.
*G06F 7/00* (2006.01)
(52) U.S. Cl. .................... 700/215; 700/230; 406/4
(58) Field of Classification Search .............. 406/3, 406/4, 5, 6, 7; 700/215, 230
See application file for complete search history.

(56) References Cited

U.S. PATENT DOCUMENTS

| | | | |
|---|---|---|---|
| 2,043,293 A | 6/1936 | Jennings | 406/4 |
| 2,773,658 A | 12/1956 | Otteren et al. | 406/31 |
| 2,797,057 A | 6/1957 | Sindzinski et al. | 406/6 |
| 2,815,182 A | 12/1957 | Mittag et al. | 406/5 |
| 2,850,249 A | 9/1958 | Uderstadt | 406/5 |
| 2,943,814 A | 7/1960 | Mittag et al. | 406/5 |
| 2,970,791 A | 2/1961 | Hafner et al. | 405/5 |
| 2,997,253 A | 8/1961 | Mittag et al. | 406/5 |
| 3,055,611 A | 9/1962 | Stout et al. | 406/5 |
| 3,055,612 A | 9/1962 | Stout et al. | 406/5 |
| 3,219,989 A | 11/1965 | Kuhrt et al. | 406/37 |
| 3,223,353 A | 12/1965 | Kuhrt et al. | 406/5 |
| 3,238,515 A | 3/1966 | Schrader et al. | 365/224 |
| 3,295,662 A | 1/1967 | Crosby et al. | 406/6 |
| 3,332,639 A | 7/1967 | Joy | 406/5 |
| 3,333,787 A | 8/1967 | Voitas et al. | 406/6 |
| 3,361,384 A | 1/1968 | Thorburn | 406/5 |
| 3,507,460 A | 4/1970 | Norman et al. | 406/5 |
| 3,813,058 A | 5/1974 | Smith et al. | 243/16 R |
| 4,529,335 A | 7/1985 | Hilbert et al. | 406/1 |
| 4,630,216 A | 12/1986 | Tyler et al. | 364/478 |
| 4,646,245 A | 2/1987 | Prodel et al. | 364/468 |
| 4,786,229 A * | 11/1988 | Henderson | 414/801 |
| 4,831,540 A | 5/1989 | Hesser | 364/468 |
| 4,941,181 A | 7/1990 | Igarashi et al. | 382/1 |
| 4,974,166 A | 11/1990 | Maney et al. | 364/478 |
| 5,097,421 A | 3/1992 | Maney et al. | 364/478 |
| 5,166,884 A | 11/1992 | Maney et al. | 364/468 |
| 5,190,428 A | 3/1993 | Bryant et al. | 414/403 |
| 5,196,846 A | 3/1993 | Brockelsby et al. | 340/933 |
| 5,217,328 A | 6/1993 | Lang | 406/1 |
| 5,234,292 A | 8/1993 | Lang | 406/1 |
| 5,260,694 A | 11/1993 | Remahl | 340/674 |
| 5,386,364 A | 1/1995 | Tyler | 364/424.02 |

(Continued)

*Primary Examiner*—Joe Dillon, Jr.
(74) *Attorney, Agent, or Firm*—Marsh Fischmann & Breyfogle LLP

(57) ABSTRACT

A system and method provides for the identification and monitoring of carriers within a pneumatic carrier system. Each carrier which is to be employed within the system includes an identification device such as a radio frequency identification (RFID) chip which has stored thereon identification information for the carrier. Positioned throughout the system are communications devices such as antennas and readers which are employed to read and/or write identification information on the chip. When a carrier is put in the system, a destination location can be associated with the particular carrier ID. This associated information is then employed to, among many things, monitor and confirm identity of the carrier as it moves to its destination.

9 Claims, 16 Drawing Sheets

U.S. PATENT DOCUMENTS

| | | | |
|---|---|---|---|
| 5,434,790 A | 7/1995 | Saka et al. | 364/468 |
| 5,436,611 A | 7/1995 | Arlinghaus, Jr. | 340/323 R |
| 5,655,677 A | 8/1997 | Fratello et al. | 220/4.22 |
| 5,661,743 A | 8/1997 | Nagai | 372/46 |
| 5,712,789 A | 1/1998 | Radican | 364/478.14 |
| 5,864,485 A * | 1/1999 | Hawthorne et al. | 700/229 |
| 6,076,652 A * | 6/2000 | Head, III | 198/341.07 |
| 6,356,802 B1 * | 3/2002 | Takehara et al. | 700/215 |
| 7,136,721 B2 * | 11/2006 | Sano et al. | 700/215 |

* cited by examiner

STATUS:
IDENTIFY CARRIER
CARRIER ID #321
DISPATCHED FROM: STATION 21, ER
AT 1:27:03 PM-3/26/04
SENT TO: STATION 30, 5TH FLOOR
CENTRAL LAB

FIG.8

STATUS:
IDENTIFY CARRIER
CARRIER ID #321
DISPATCHED FROM: STATION 21, ER
AT 1:27:03 PM-3/26/04
ARRIVED: STATION 30, 5TH FLOOR
CENTRAL LAB AT 1:28:02

FIG.9

SYSTEM AND METHOD FOR CARRIER IDENTIFICATION IN A PNEUMATIC TUBE SYSTEM

CROSS REFERENCE TO RELATED APPLICATIONS

This application claims priority under 35 U.S.C. §119 to U.S. Provisional Application No. 60/556,819 entitled: "SYSTEM AND METHOD FOR CARRIER IDENTIFICATION IN A PNEUMATIC TUBE SYSTEM," and having a filing date of Mar. 27, 2004, the contents of which are incorporated herein by reference.

FIELD OF THE INVENTION

The present invention relates generally to the field of pneumatic tube carrier systems, and more particularly to a system and method for improved carrier handling in a pneumatic tube carrier system employing carrier identification carrier monitoring technology such as radio frequency identification (RFID).

BACKGROUND OF THE INVENTION

Pneumatic tube carrier systems are a well-known means for the automated transport of materials between a multitude of locations, any of which may be the origination location or destination location of a transport carrier. A typical system includes a number of pneumatic tubes interconnected in a network to transport carriers between a number of user stations. Various blowers and transfer units provide the force and path control means, respectively, for moving the carriers through and from tube-to-tube within the system.

Directing traffic in a pneumatic tube carrier system is a system control center (SCC). An SCC may determine carrier paths, or routes, through a system, carrier location within a system, and carrier path change solutions in situations where gridlock conditions occur. In current systems, such determinations are largely based upon "predictions", or inferences, as to where each carrier "should be" within a system given the times/locations of entry and intended transport paths of all carriers concurrently handled by the system.

In current practice, however, carriers can be delivered to locations other than their intended destinations for several reasons. For example, a system may misdirect a given carrier as a result of equipment error. Alternatively, a system may misdirect numerous carriers as a result of the presence of a "floater" carrier (e.g., an unidentified carrier) within a system. That is, the presence of even a single, unaccounted for carrier may severely undermine the accuracy of a number of prediction-based determinations made by an SCC, thereby adversely impacting the handling of numerous carriers.

SUMMARY OF THE INVENTION

Described herein is an improved system and method for carrier handling in a pneumatic tube carrier system. Included in the system are a plurality of communications devices such as antenna devices/readers which are positionable at locations throughout the system, wherein the communications devices are configured to communicate with identification devices positionable on carriers employed in the system. Further included in the system are a plurality of user interface devices positionable at various locations within the system (e.g., origination/destination locations), wherein the user interface devices are minimally configurable to receive destination information which may be associated with a particular carrier (e.g., as input by a user).

The communications and interface devices are further connectable to a central controller, wherein the controller is configurable (i) to receive carrier identification information from communication devices and destination/routing information from the interface devices, and to (ii) associate the destination information and identification information for a particular carrier transport operation, wherein a "transaction record" may be initiated and stored. In turn, as one or more carriers move within the system, the central controller is able to monitor actual carrier location.

The central controller may be configured to employ the identification information associated with the carriers in a number of different scenarios. In a typical scenario, the central controller may receive identification information for a carrier positioned at an origination location (e.g., via a communications device located at the origination station). In conjunction with the receipt of the identification information, destination information may be entered by a system user through a user interface device located at the origination station. The central controller may then associate the identification information with the destination information by one or more central database entries to initiate a carrier transaction record. In addition to identification, origination and destination information it will be appreciated that the database entries/transaction records may further include, inter alia, one or more of the following: date and/or time information (e.g., arrival/dispatch times), security information (e.g., access restrictions), status information, and/or carrier type information. The central controller may then employ preprogrammed control logic to process a given transaction. Most typically, the central controller may determine a path for carrier travel through the system and provide control instructions to routing controllers to control carrier transport operations.

Once a carrier reaches a destination station, a communications device located at the destination station may be employed to extract the corresponding identification information and update transaction information associated with the carrier. Such transaction information may be stored in the identification device for a given carrier and/or otherwise maintained by the central controller in a central database (e.g., in a transaction record). In the latter case, if the actual destination of a given carrier is not the same as the intended destination, the central controller may provide alarm or other alert signals to user interfaces provided at either or both of the origination and destination stations.

As mentioned above, the communications devices are positionable at various locations throughout the system. These locations may include origination/destination stations as well as intermediate locations (i.e., between origination and destination locations). For instance, system routing controllers, e.g., transfer stations, transfer control units (TCUs), and multi-linear transport units (MTUs) as well as the system's pneumatic tubes may incorporate one or more communications devices. Positioning the communications devices at various locations throughout the system provides for monitoring, or tracking, the actual location of carriers as they proceed through the system. Such functionality facilitates a number of system capabilities. For instance, such information (e.g., tracking information) can be used by central controller to address issues that may arise through unforeseen conditions in the system, such as the presence of a "floater".

In one configuration of the system, the plurality of communications devices is radio frequency identification (RFID) compatible, e.g., wherein each carrier may include a RFID identification chip which is configured to communicate with a plurality of antenna devices/readers. Both the antenna devices/readers and the identification chips may be programmed in a read-only configuration, wherein information is only readable off a RFID chip by a reader. Alternatively, readers and RFID chips may be provided for read/write operations, wherein information is readable from a chip as well as writeable thereon. Further, hybrid systems are employable which provide for both read and limited write functions for RFID chips (e.g., certain fields of information on the chips are only readable and other fields of information on the chips are readable/writable). However, it will be appreciated that other communication devices/readers may be utilized. Such devices include, without limitation, bar codes and optical readers.

In one aspect of the present invention, the communication devices and identification devices allow for maintaining a predetermined inventory of carriers at different locations throughout the system. In this regard, records stored accessible by the central controller may include inventory records for each station and/or carrier within the system. Each time a carrier is dispatched and/or received by a station, a data entry associated with the quantity of available carriers for such that station may be updated. Likewise, the identity of the carrier received/dispatched may be cross-checked with the inventory records. In this regard, if a user physically transports a carrier between stations, the inventory records of both stations may be accurately adjusted to indicate their actual inventory. That is, the inventory of the station from which the carrier was removed may be adjusted even though the carrier was dispatched from another station.

Based on the inventory record, spare carriers may be directed to a station having less than a predetermined inventory of carriers. In this regard, the system may be operative to dynamically maintain a predetermined inventory of carriers at each user station. Stated otherwise, a controller may be operative to automatically redistribute inventory carriers that are either located at carrier storage locations within the system or re-entered into the system in an empty state. Carrier storage locations may include, without limitation, system routing controllers (e.g., MTUs, TCUs, etc) as well as dedicated empty carrier storage repositories. Furthermore, such inventories may be established and maintained on a carrier-type specific basis, as will be discussed herein.

In conjunction with providing inventory control of the carriers, the system may be operative to provide various user prompts/messages to the user stations in order to maintain desired inventories. For instance, a station having an excess number of carriers may receive a message or prompt requesting that an empty carrier be returned to the system for redistribution. As will be appreciated, the present aspect allows for maintaining a predetermined inventory of carriers at each user station without necessitating that each carrier be assigned to a particular station.

In another aspect of the present invention, the system may be configured to differently route carriers of different types. For example, in certain situations a system operator may wish to use different types of carriers to carry different types of material (e.g., between different system zones). That is, the system may be operative to segregate general use and special use carriers without human intervention. For instance, in hospital applications, certain carriers may be designated for use in carrying biological materials (e.g., test samples) whereas other carriers may be utilized for general use (e.g., paperwork). Accordingly, in some instances it may be desirable to prevent co-mingling of different carriers types and/or utilizing the same transport tubes for different carrier types. In this regard, routing decisions for the carriers may be based on traffic conditions as well as carrier type.

The system may utilize identification information from the carriers to identify a carrier type associated with the carriers. Based on the carrier type, one or more actions within the system may be restricted. For instance, a user may be prevented from sending a special use carrier to a general use station. That is, a carrier type may be compared to an allowable carrier type associated with a destination and/or present location of a carrier. Accordingly, an output may be generated, for example, a warning indicating that an incompatible carrier/user station combination exists. Such warning may be provided on a display device and/or as an audible alarm.

In instances when an incompatible carrier/user station combination exists, the carrier may be dynamically routed to an acceptable recovery location. Preferably, identification of incompatible carrier may be provided to an intended destination station and/or to an origination station for such an incompatible carrier such that system users may take remedial steps to recover the carrier.

In another aspect of the present invention, transaction records may be generated that provide actual travel path information for the carriers. In this regard, the transaction records may identification information, location information, and time information corresponding to when a carrier is located at a given location within the pneumatic carrier system (e.g., relative to a communications device). Accordingly, the time and location for the carrier may be stored to the transaction record on a computer readable storage medium. As the carrier travels through the system relative to various communication devices therein, additional entries may be added to the transaction record such that a travel path for the carrier may be generated. This travel path may be utilized for monitoring purposes to determine, for example, receipt of restricted items (e.g., controlled substances) as well as for system maintenance purposes, as will be discussed herein.

In another aspect of the present invention, the system may be operative to facilitate remedial steps in the event of receipt of a suspect/compromised carrier. For instance, in the event that a received carrier is leaking its contents, a user may provide a suspect carrier input at the receiving user station.

In response to this input, the system may obtain the identification information of the suspect carrier. Accordingly, this identification information may be correlated with the stored entry/transaction records that include travel path information through the system for the suspect carrier. Based on this travel path information, one or more portions of the travel path through the pneumatic carrier may be deactivated. Such deactivated portions of the system may then be treated in a remedial fashion by maintenance personnel. Furthermore, the system may be configured to access transaction records associated with all carriers traveling through the system during a period of time associated with the transport of the suspect carrier. For instance, all carriers subsequently passing through the travel path of the suspect carrier may be identified. In turn, instructive messages may be sent to corresponding user interfaces so that potentially affected carriers may be inspected and otherwise handled in accordance with pre-established protocols. As will be appreciated, messages may also be provided system wide to each user station and/or user interface. Alternatively, the travel path associated with each of those carriers may be deactivated for remedial purposes. Likewise, the entire system may be deactivated upon receipt of the suspect carrier input.

According to another aspect of the present invention, the identification information associated with each carrier may be utilized to provide a confirmation of proper carrier location within the system. For instance, upon receiving a pneumatic carrier in the system the identification information from the identification device associated with the pneumatic carrier may be read. Accordingly, that identification information may be associated with a transaction record currently associated with the carrier. A destination location from the transaction record may then be compared with the current location of the pneumatic carrier such that the pneumatic carrier may be identified (1) as being at a correct location or (2) as being at an incorrect location. In one arrangement, when the carrier is at an incorrect location the method may further include dynamically re-routing the carrier to the location associated with the destination information. That is, the carrier may be automatically re-routed to its correct destination location. Alternatively and/or in addition, an output may be generated indicating the carrier is at an incorrect location. Such an output may be provided at the location of the carrier, the origination location of the carrier and/or an intended destination location for the carrier.

In another aspect of the invention, the system may utilize carrier transaction information to facilitate re-initiation of the system after a power outage and/or an urgent off situation. That is, subsequent to an urgent off or power loss, each of the carriers in a system needs to be identified and routed to their intended destinations upon reinitiation. For such purposes, the central controller, which is in communication with the various communications devices, may read the identification information from the carriers in the system and then compare the identification information with database/transaction records. If the carriers and their corresponding records can be identified, their routing information is retrieved from memory and then employed to dynamically route the carriers to their destinations in a normal fashion. The controller may be configured to systematically read each carrier identification device in all the various temporary storage locations in the system such as the MTUs and TCUs until the traffic is cleared. If a carrier cannot be identified, it may be moved to a recovery zone. Once all the carriers are either routed to their destinations or a recovery zone, the system may resume normal operations.

In a further aspect of the invention, the system may utilize carrier transaction information to facilitate scheduled carrier maintenance. By way of example, the central controller may utilize carrier transaction information from a database that keeps track of the number of transactions, or time in service, for each carrier, and compare such information to predetermined maintenance thresholds to determine whether a given carrier should be removed from the system for inspection/maintenance procedures. In the event a maintenance operation and inspection/maintenance operation is in order, the transaction information for a given carrier can be utilized to identify the location of the carrier and provide instructions to the corresponding user station (e.g., instructions to send the given carrier to a inspection/maintenance location within the system).

In another aspect of the present invention, user interface devices located within the system (e.g., at origination and destination stations) may be provided to allow system users access and display transaction records associated with system carriers. Such records may include the dispatch and/or receipt information for a given carrier and/or for a given station. In this regard, a user may utilize the interface devices to review transaction histories for carriers and/or stations. Further, such interface devices may be used to provide information relating to the occurrence of an event within the system. For instance, a display device associated with such an interface device may be operative to provide a visual indication that a pneumatic carrier dispatched from an origination station has arrived at a second location in the system (e.g., a destination station). Likewise, the destination station may be operative to provide an indication that a pneumatic carrier is destined for that location and/or arrived at that location. Further, the user interface devices may provide indications regarding the location of one or more carriers as those carriers pass through the system (e.g., from an origination station to a destination system).

The visual indications generated at the user interfaces regarding the occurrence of an event within the system may include text messages. Such text messages may indicate, inter alia, the origination location of a carrier, a destination location for the carrier, an identification of a sending party, an identification of a receiving party, the priority of the carrier, an indication of the contents of the carrier and/or a current status of the carrier (e.g., in transit, ETA, etc.). Preferably, such messages may be displayed proximate to the user stations for user convenience.

In one particular arrangement of the present aspect, the display device may provide a graphical representation of the pneumatic carrier system. Such a graphical representation may include visual indicia (e.g., icons) that relate to system components such as destination/origination stations, transfer units, blowers, tubes etc. Accordingly, the position of one or more pneumatic carriers may be depicted on the graphical representation of the pneumatic carrier system. These positions may be updated such that the movement of the carriers through the system may be monitored (e.g., in substantially real-time).

As will be appreciated, use of a graphical representation of the pneumatic carrier system may further allow for providing a visual indication of the current status of one or more systems within the system. For instance, if a portion of the system is offline or otherwise inactive, appropriate representation may be provided on the graphical representation. Furthermore, such a graphical representation may be provided on a user interface that is not associated with a particular destination and/or origination location. That is, such a graphical representation may be provided at a central controller/system administrator location such that overall status of the system may be monitored remotely. As will be appreciated, a graphical user interface may be incorporated in to the present arrangement to allow touch screen control of various system functions.

Numerous additional configurations and advantages of the present invention as facilitated by the present invention would be apparent to those skilled in the art upon consideration of the further description that follows.

BRIEF DESCRIPTION OF THE DRAWINGS

FIG. 8 shows a first display output of a user interface.

FIG. 9 shows a second display output of a user interface.

DETAILED DESCRIPTION

Figure 1:
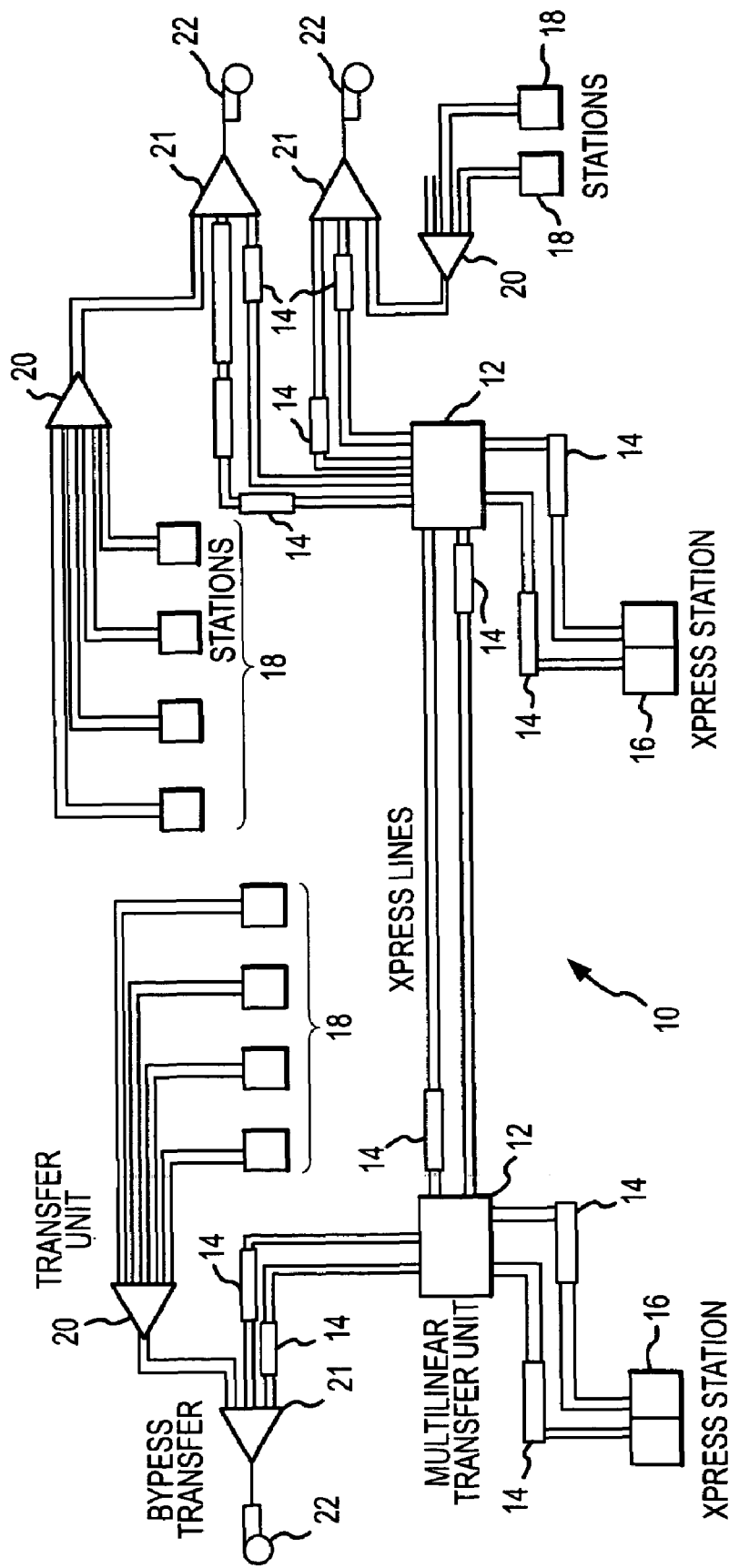
FIG. 1 discloses a mechanical diagram for the pneumatic carrier system.

Disclosed in FIG. 1 is a system diagram for a pneumatic carrier system 10 within which the invention described herein is employable. In general, the pneumatic carrier system 10 transport pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 is a transfer unit 20 which orders carriers arriving through different tubes from a different stations 16, 18 into a single pneumatic tube. This pneumatic tube is further in connection with a vacuum by-pass transfer unit 21 (i.e., turn around transfer unit) and a blower 22 that provides the driving pneumatic force for container movement. A set of transfer units 20, a blower 22 and one or more stations 16, 18 typically define a single zone, with a corresponding by-pass transfer unit 21 being a point of connection to a network and the other zones connected thereto.

Within the system 10 itself, one or more devices are employable for ordering and routing carriers to their selected destinations. One type of device is a traffic control unit (TCU) 14 which is employable to receive, temporarily store and release a number of carriers. In certain configurations, one or more TCUs 14 may be provided to operate as linear storage devices, e.g., on a first in first out (FIFO) basis or last in first out (LIFO) basis. In other configurations, one or more TCUs 14 may be provided to operate as matrix style storage devices which store carriers in two-dimensional matrixes, wherein each carrier is separately storable, retrievable and releasable without movement of other carriers stored in the matrix.

Also included in the system 10 are multi-linear transfer units (MTUs) 12 which have functionality to direct carriers from one pneumatic tube to another. For example, a MTU 12 may receive a carrier released by a TCU 14 in a first tube and direct the carrier along a second pneumatic tube in the system 10 to complete a given transaction. The configuration of the TCUs 14 and MTUs 12 will be described in greater detail below.

Figure 2:
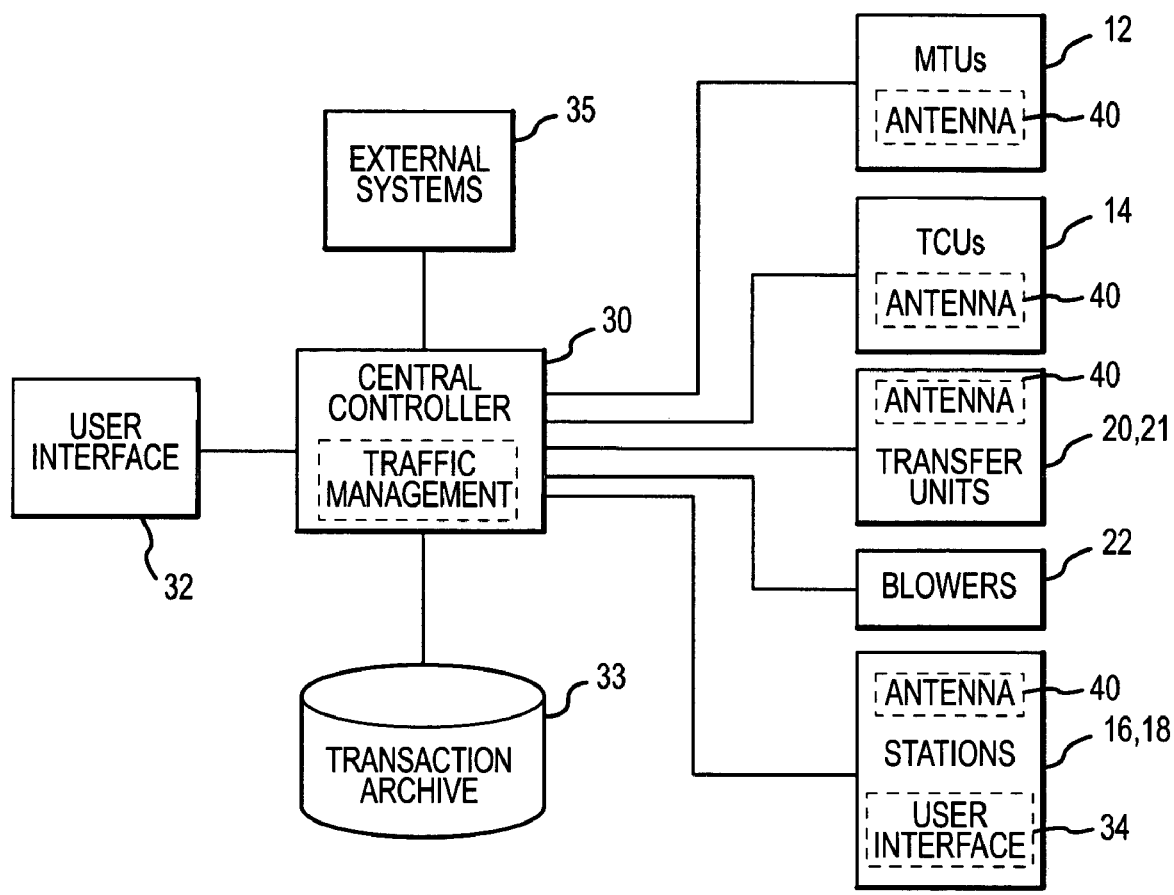
FIG. 2 discloses a system diagram for the operation and monitoring of the pneumatic carrier system.

All of the components described in FIG. 1 are electronically connected to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. SCC 30 may be configured as one or more programmable digital computers. Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10.

In this regard, components 12, 14, 16, 18, 20, 21 and 22 shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation.

Of note, incorporated into each of the user stations 16, 18, MTUs 12 and TCUs 14 is at least one antenna device/reader 40 configured to energize and retrieve identification information from identification devices such as ID chips incorporated into each of the carriers. As will be appreciated, the utilization of antenna devices/readers 40 and carrier ID chips yield significant advantages in the described system 10.

Figure 3:
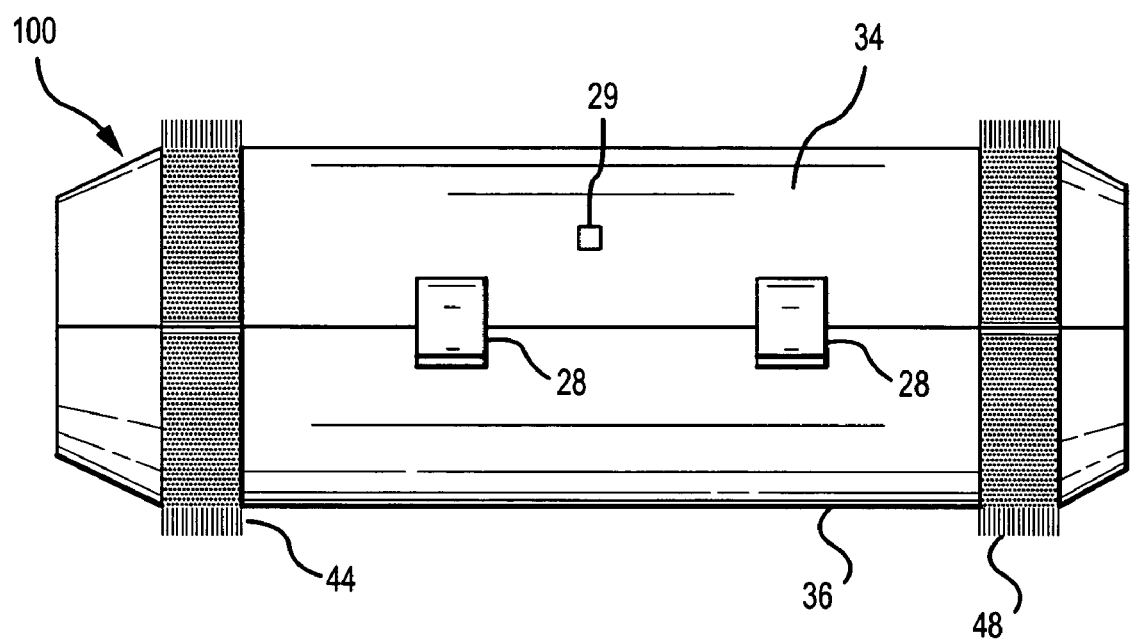
FIG. 3 discloses a view of the pneumatic carrier including an identification chip.

Disclosed in the FIG. 3 is a view of a pneumatic system carrier 100 which includes at least one identification device, or, as shown ID chip 29. Though shown as a small, integrated chip, it will be appreciated that other identification devices may be used and that the configuration and location of the identification device may vary. For instance, the identification device may be formed as a band disposed about the circumference of the carrier 100 to allow reading the identification device by an antenna device/reader 40 irrespective of the orientation of the carrier 100. In a typical carrier, the carrier 100 includes first and second shell members 34 and 36 which are adjoinably cylindrical in cross-section for use in correspondingly cylindrical tubes of the system 10. The shell members 34 and 36 may be pivotably interconnected by a hinge member (not shown), and latches 28 may be provided for securing the first shell member to the second shell member in a closed configuration. Also included as part of the carrier 100 are wear bands 44, 48.

Incorporated into one of the shell members 34, 36 and/or wear bands 44, 48 (e.g., disposed beneath one or both bands 44, 48) is the ID chip 29. This ID chip 29 is configured to store and provide access to identification information written thereon. In one configuration of the system, the ID chip 29 may be a read-only chip. That is, an antenna device 40 may only read information off the ID chip 29. Typically, these types of ID chips 29, or tags, are sequentially numbered at a production facility to ensure that the customer gets tags with truly unique numbers. Further, such ID chips 29 may be encrypted or include encrypted information such as a code that may be, for example, specific to a given system 10. Use of such encryption may prevent the use of non-authorized carriers 100 in the system 10, which may not be correctly configured for the system 10.

Alternatively, ID chips 29 may be provided so that an antenna 40 may write information to the ID chips 29 as well as read data therefrom. For example, information corresponding with an origination station, time of departure, intended destination station, actual destination station and/or time of arrival may be written into the chips 29. Further, the identity of a person who has performed a certain operation in relation to a transported material can be written to the corresponding ID chip 29 along with the date and time the action was performed. When the carrier 100 containing the material moves from a first station 16, 18 to a second station 16, 18, information can be read off the ID chip 29 and sent to the SCC 30 (e.g., for storage). In some instances, the ID chips 29 may be read while the carrier 100 is in motion (i.e., on the fly). In this regard, antenna device/readers may be incorporated into pneumatic tubes within the system 10 as well as the system components such as 12, 14, 16, 18, 20, 21 and 22. In any case, data read from the ID chips 29 can then be stored and augmented and/or replaced by identity, date and time information corresponding with further actions performed at a second station location.

Another alternative is a hybrid system that uses write capable ID chips 29 that are custom configured by the user in a read-only system. An example of the type of information that may be written on such an ID chip 29 may include a home station/identification address for each carrier 100. In such arrangements, after a carrier 100 has reached a destination station, the corresponding home station information may be accessed and employed to automatically return the carrier 100 to a home station upon initiation of an empty send operation at the destination station.

Figure 4:
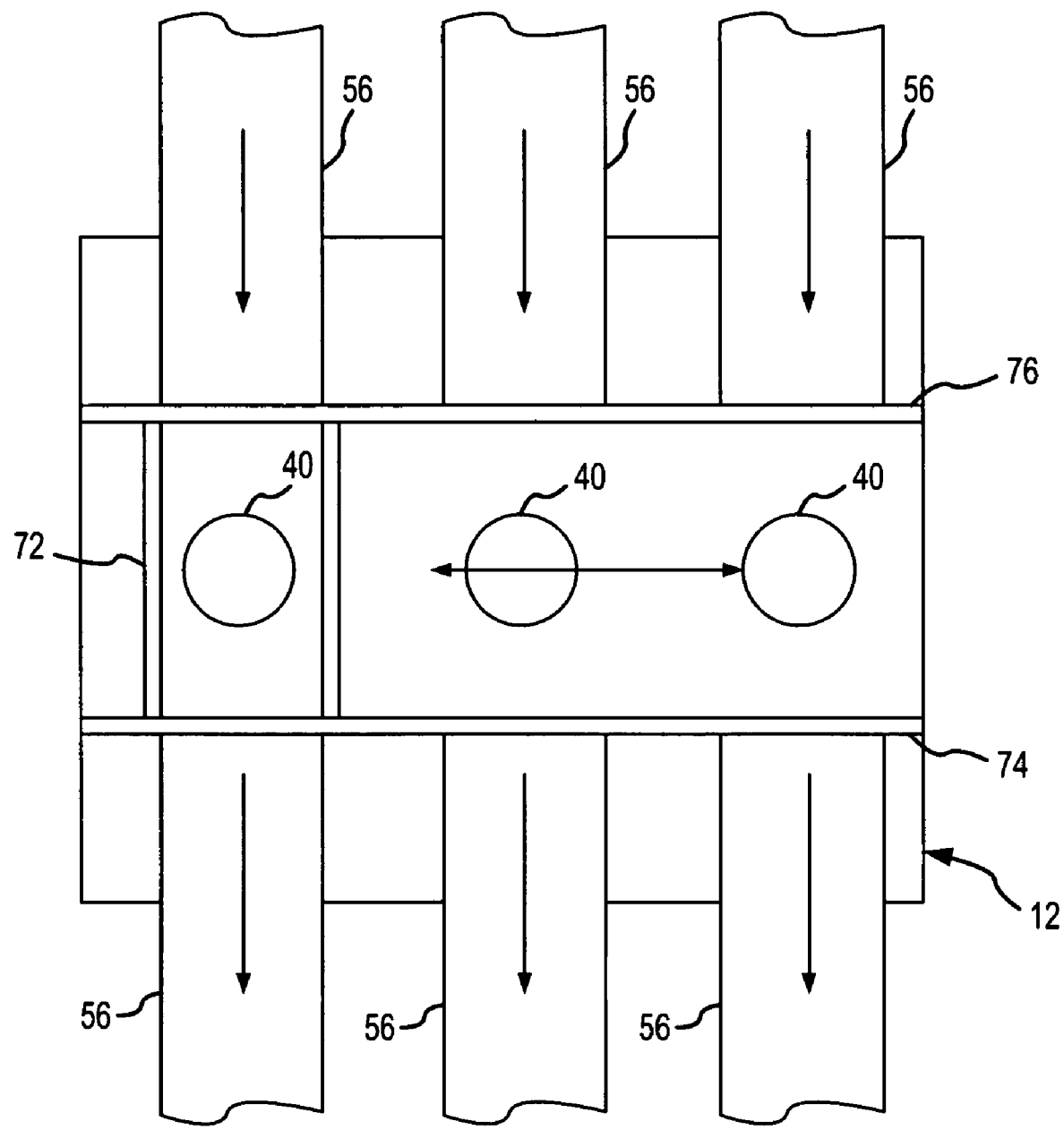
FIG. 4 discloses a geometric view of a transfer carrier unit (TCU).

As was noted above, antennas devices/readers 40 may be incorporated into each of the various user stations 16, 18, TCUs 14 and MTUs 16 of a pneumatic tube system. Disclosed in FIG. 4 is a breakaway view of an exemplary MTU 12 embodiment including an antenna device/reader 40. As can be seen, the MTU 12 is interconnected with a number of incoming tubes 56 through which carriers are delivered to the MTU 12. Exiting from the MTU 12 are a number of exit tubes 56 which direct a carrier to a destination zone. Included in the MTU 12 is a carrier delivery device 72 (e.g., a bucket 72) which is moveable along guides 74 and 76 so as to receive carriers directed to the MTU 12 through pneumatic tubes 56 and then, in response to an instruction signal received from the SCC 30, if necessary, move the received carrier along the guides 74 and 76 to align the carrier with a selected exit pneumatic tube 56. Once a pneumatic vacuum force is applied to the selected exit tube 56, the bucket 72 releases the carrier.

Also included in the MTU 12 are one or more antenna devices/readers 40. These antenna devices/readers 40 are in communication with the SCC and configured to perform the read functions and write functions, if so configured, in relation to the ID chips incorporated into carriers which pass through the MTU 12. As can be seen, a number of antenna devices/readers 40 may be positioned relative to the pneumatic tubes 56 such that the movement of a carrier into and out of each of the pneumatic tubes 56 may be monitored.

Figure 5:
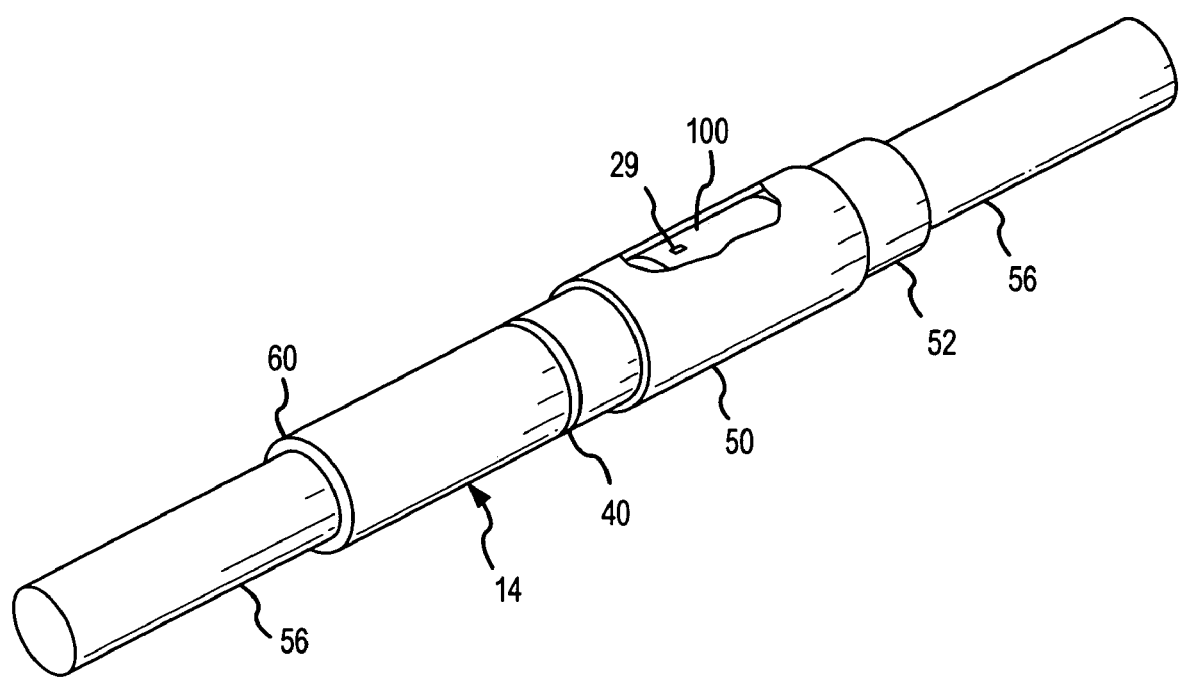
FIG. 5 discloses a view of a multi-linear transfer unit (MTU).

Disclosed in FIG. 5 is a breakaway view of an exemplary TCU 14 embodiment interconnected with a pneumatic carrier tube 56 within the system 10. The TCU 14 includes a sleeve portion 50 which is sized to receive and hold a number of carriers 100. The TCU 50 includes a receipt mechanism 60 which provides for the entry of carriers 100 into the sleeve portion 50. Also included is an exit mechanism 52, controllable by the SCC 30, which provides for the release of a carrier 100 from the TCU 14. Also includable in the TCU 14 is at least one antenna device/reader 40 which may be employable to identify carriers 100 received within the TCU 14 and provide this information to the SCC 30. In one configuration, antenna device/reader 40 may encircle a portion of the TCU 50, and when an ID chip 29 on a carrier 100 passes within proximity of the antenna device/reader 53, the identification information may be extracted therefrom. In the configuration of the system where the TCU 14 is constructed of mostly metallic materials, the portion of the TCU 14 in which the antenna device/reader 40 is located may be constructed of a material that is different from the rest of the TCU 14. For example, this portion may be made of a plastic material so as not to interfere with the operation of the antenna device/reader 40.

Returning again to the electrical system diagram of FIG. 2, it may be seen that various transfer units 20, 21 and blowers 22 are also electrically connectable to the SCC 30. Through these connections, SCC 30 may send command signals to these devices so that they are actuated and operating at particular times and in particular sequences to affect the completion of the various carrier transactions. Other signals exchanged may include various monitoring signals that indicate the devices are operating as desired.

As shown in FIG. 2, the SCC 30 is connectable to the various stations 16, 18 throughout the pneumatic carrier system 10 which are the origination and destination points for carriers 100. Signals transmitted between the SCC 30 and the stations 16, 18 relate to carrier identification information. Further, signals transmitted between user interfaces 32 and the SCC 30 may relate to destination and priority information entered for particular transactions, indications that a transaction has been initiated and/or completed, and various operational signals (e.g., alarms) which relate to the operational status of a user station 16, 18.

The SCC 30 is further connectable to a transaction archive 33, or database, which is configured to store transaction information for carriers 100 moving within the system 10. The transaction information may include identification information for carriers 100 moving through the system and destination information entered by a system user. Further, the transaction information may include location information obtained via tracking inputs received from antenna devices/readers 40 located at user stations 16, 18, TCUs 12 and MTUs 16 along the travel path of a given carrier 100. The transaction information may also include security information entered by system user to limit who may receive the carrier 100. Still further, transaction information may also include a designation of a "type" of a carrier 100 as well as information as to whether a carrier 100 has reached a selected destination. The use of this transaction data will be described in greater detailed below.

The external systems 35 connected may depend on the purpose of the pneumatic carrier system 10. For example, the external systems 35 may include a lab information system, a pharmacy information system, a patient information system, as well as a security information system.

In operation, the antenna devices/readers 40 positioned throughout the pneumatic carrier system identify carriers 100 as they pass from one location to another. Generally, when a carrier 100 is to be employed for carrying some type of object from an origination station 16, 18 to a destination station 16, 18, it may be identified using the antenna device/reader 40 at the origination station 16, 18. Once a destination is selected for the particular carrier 100, the identification information may be associated with the path calculated for the carrier 100 through the pneumatic carrier system 10 and the destination. This information may be stored in a data entry (e.g., transaction record) within the transaction archive 33. As the carrier 100 moves from one location to another, the antenna device/reader 40 at the various locations will energize the ID chip 29 and extract the identification information. Once a carrier 100 reaches a destination, the ID chip 29 information may then be confirmed against transactions that are intended to be received at the particular destination. Additionally, upon arrival at a destination, a confirmation may be provided to the origination station.

Figure 6B:
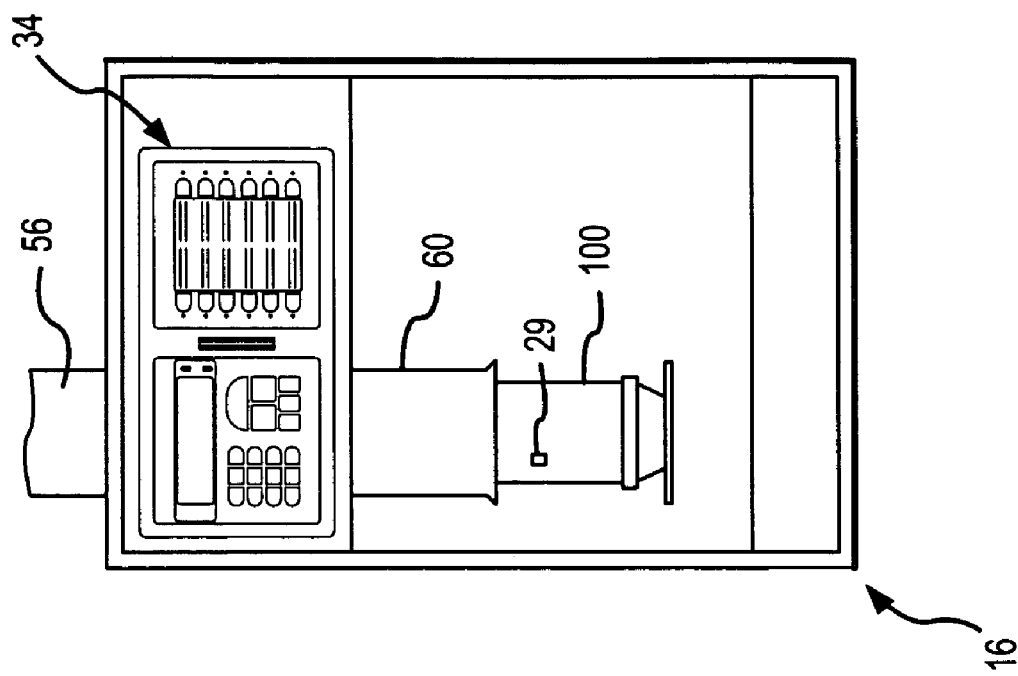
FIGS. 6a and b disclose views of carrier stations within the pneumatic carrier system.
Figure 6A:
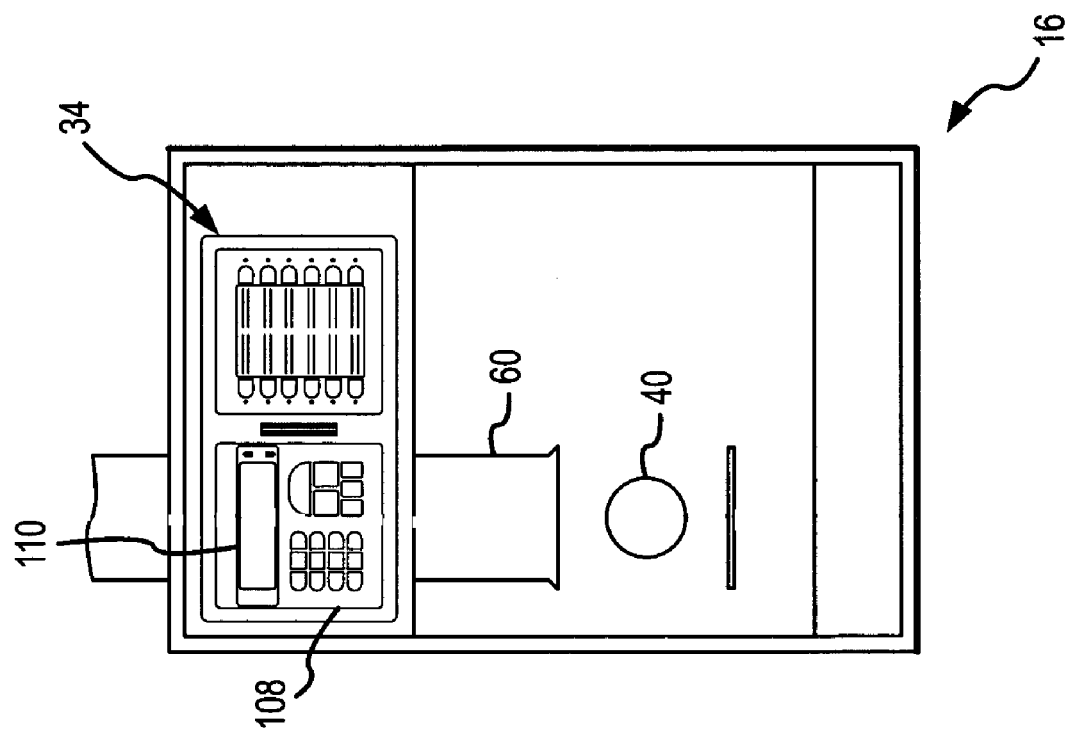

FIGS. 6a and 6b are front views of a station 16 which is employable in the pneumatic carrier system 10 described herein. As shown, the station 16 includes a dispatcher connected to a pneumatic tube 56 that is employable for transporting and delivering carriers 100 to and from the station 16. Also included with the station 16 is a user interface 32 that includes a control panel 108 that has a number of interactive devices which a system user may employ for entering data including, for example, destination information, priority information, and security information (e.g., a personal identification number (PIN)). The control panel 108 is also employable for entering data for a carrier 100 received at a station. For example, if a carrier 100 has a security limitation associated with it, release authorization information can be entered to complete delivery of the carrier 100 at the destination location. Also included with the user interface 32 is a display 110 which is configured to present messages relating to transaction and system status which are viewable by a system user. The use of the user interface 32 will be described in greater detail below.

Also positioned relative to the dispatcher 60 are a carrier holder 62 and an antenna device/reader 40. As with the other antenna devices/readers 40 described above, this device is configured to read information, and write information if so configured, on an ID chip 29 incorporated into a carrier 100. Though shown as utilizing a single antenna device/reader 40, it will be appreciated that the station 16 may include two or more such devices. That is, the station 16 may include a first antenna device/reader for reading ID chips 29 on carriers that are received by the station 16 (e.g., prior to releasing the received carrier in response to an authorization code) as well as a second antenna device/reader 40 associated with the dispatcher 60. The holder 62 is configured such that a system user may place a carrier on the holder 62 and enter destination information through the control panel 108. Once all the appropriate information has been entered, the dispatcher 60 will move the carrier 100 into a pneumatic tube 56 for transport to a selected destination.

Figure 7:
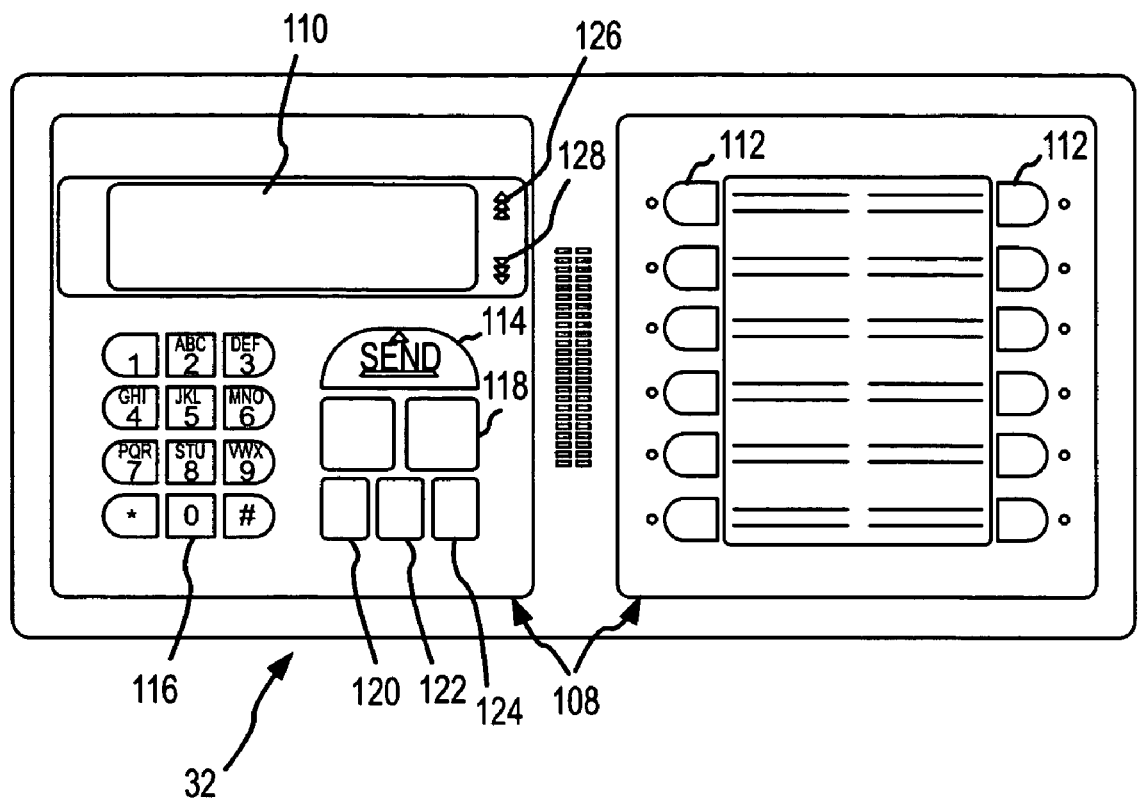
FIG. 7 discloses one embodiment of a user interface that may be used with the carrier stations.

FIGS. 6-11 illustrate the use of the user interface 32 to perform various functions within the system 10. In particular, FIGS. 6a, 6b, and 7 show one embodiment of a user interface 32 that may be incorporated into sending/receiving stations 16. As shown, the user interface 32 includes the control panel 108 and a display 110. The control panel 108 includes a number of "speed-dial" buttons 12 that may be programmed to allow a user to insert a carrier 100 into the dispatcher 60, select a preprogrammed destination station by depressing a corresponding speed-dial button 112, and dispatch the carrier 100 by depressing the send/enter button 114.

In addition, the control panel 108 includes a numeric keypad 116 for use in manually entering, for example, destination station information. The control panel 108 also includes a number of general action buttons including, for example, an empty return/send button 118 that allows for returning an empty carrier 100 to the system 10 for distribution to stations 16 that may be deficient of carriers 100. Further, the control panel 108 includes track carrier 120 and call carrier 122 functions, respectively, that will be discussed herein. Finally, the control panel 108 includes a menu button 124 that allows for accessing further system functions via the display 110.

Illustrative functions that may be accessed via the menu button 124 in use of the display 110 may include, without limitation, special user functions, administrative functions, station operating help instructions, and/or a station directory for use in identifying destination stations. In this regard, upon depressing the menu button 124, a list of options may be provided within the display 110. The user may then use the up and down buttons 126, 128 for use in scrolling through listed menu options. A desired option may be highlighted on the screen utilizing the buttons 126, 128 and selected by depressing the send/enter button 114.

Special functions may include activating and deactivating the station 16. In this regard, a station 16 may be deactivated when a user is not present. Likewise, the station 16 may be reactivated when a user is present. Further, carriers 100 may be forwarded to another station in the system 10. As will be appreciated, utilization of such special functions may require a user to enter a personal identification number (PIN) or other authorization code using, for example, the numerical keypad 116. Additional functions that may be incorporated into the special functions menu may include viewing incoming carriers 100 (e.g., by depressing the call carrier button 122), which may allow a user to identify, for example, how many carriers are destined for the station 16, 18, priority status for the carrier(s) and/or the origin of the incoming carrier(s). Further, the menu button 124 may be utilized to set a number of alarms or other audible indicators. Such indicators may include an indicator upon arrival of a carrier 100 that sounds each time a carrier 100 arrives, or a full station indicator that sounds when the station 16, 18 is full and cannot receive any additional carriers 100.

The track carrier button 120 allows for a user of a station 16, 18 to track the progress of a carrier 100 as it proceed to its destination. In this regard, a user may place a carrier 100 in the station dispatcher 60 and depress the track carrier button 120 on the control pad 108. The user may then enter the destination station's identification or, alternatively, select a speed dial 112 corresponding to the destination station and then press the send/enter button 114.

FIG. 8 shows an exemplary textual output of the display 110 upon departure of a carrier 100 for which tracking has been requested. As shown, the antenna device/reader 40 associated with the departure station 16, 18 reads the ID chip 29 on the carrier 100. In this case, the carrier is identified as number 321. Further, the display 110 may include such information as the station from which the carrier 100 was dispatched as well as the dispatch time, date, and carrier destination. The output of the display 110 may also be sent to the SCC 30 for storage in the transaction archive 33. See FIG. 2. In this regard, the output of the display 110 may correspond to a transaction record for the dispatch and receipt of a given carrier between stations.

FIG. 9 illustrates output of the display 110 upon the carrier 100 arriving at its destination station. In this regard, the display 110 output shows the time when the carrier 100 was received at the destination station. As will be appreciated, the destination station 16, 18 may utilize an antenna device/reader 40 to read the ID chip 29 of the carrier 100 received by that station 16, 18 to confirm the carrier 100 is indeed the carrier 100 (e.g., ID no. 321) that was sent by the origination station 16. That is, the information read from the carrier 100 may be checked against the transaction record, which may be stored at the archive 33. Finally, it will be noted that the transaction record displayed by the departure station 16 may also be displayed at the arrival station (e.g., incoming carrier). Additionally, the transaction record may be stored within the archive 33 by the SCC 30 for future retrieval purposes. In this regard, all transactions occurring within the system 10 may be stored.

As all transactions performed by the system may be stored within the archive 33, users may have the ability to retrieve past transactions. As will be appreciated, such functionality may be desirable for auditing purposes and/or for system cleaning purposes upon detection of a leaking carrier. In this regard, through an interface 32, a user may access previous dispatches and/or receipts (transactions) by an identified station. Such transactions may be provided in chronological order and/or by the order in which carriers passed through a selected portion of the system. Access to such information may require pass code authorization.

Figure 10:
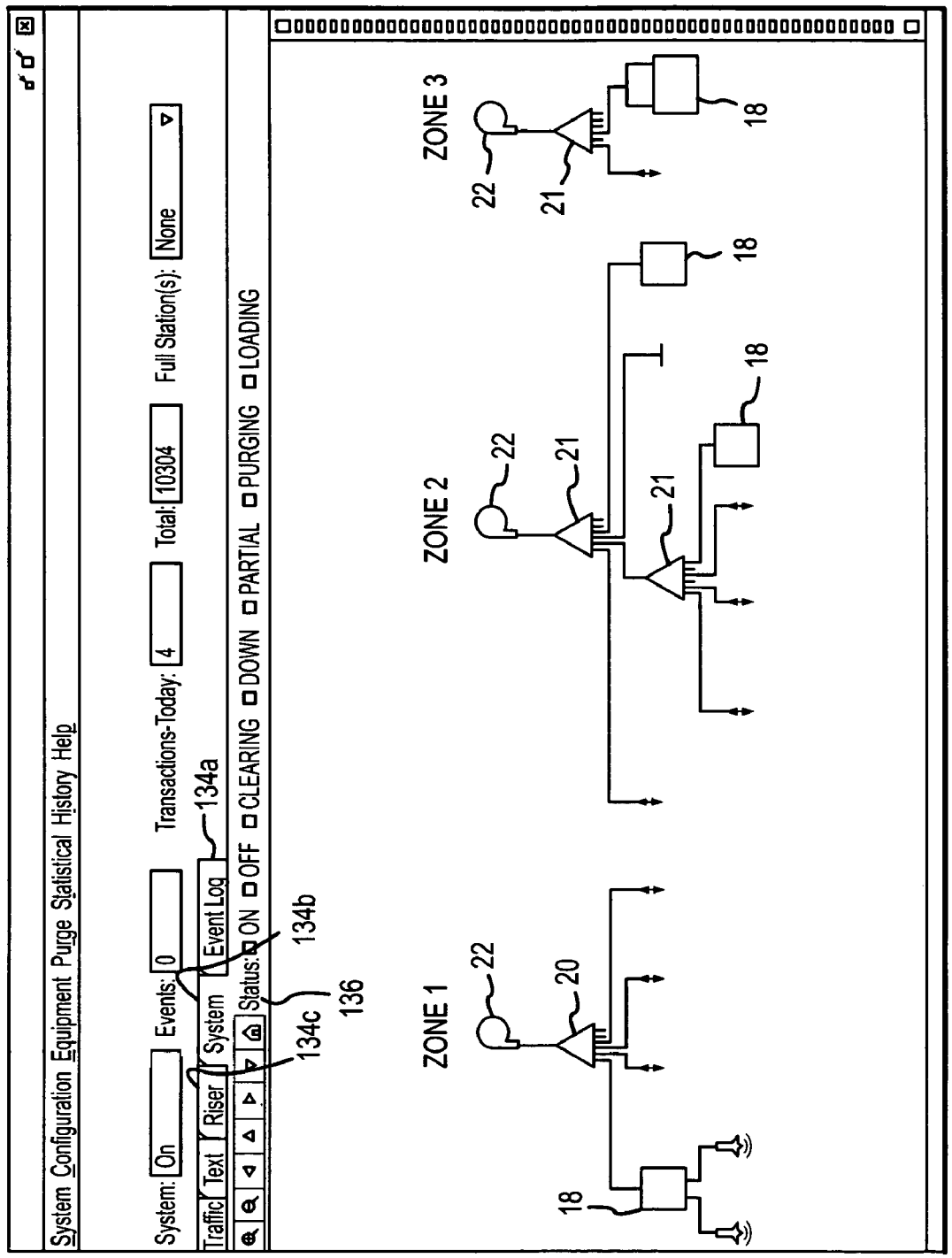
FIG. 10 shows a first display of a graphical user interface.
Figure 11:
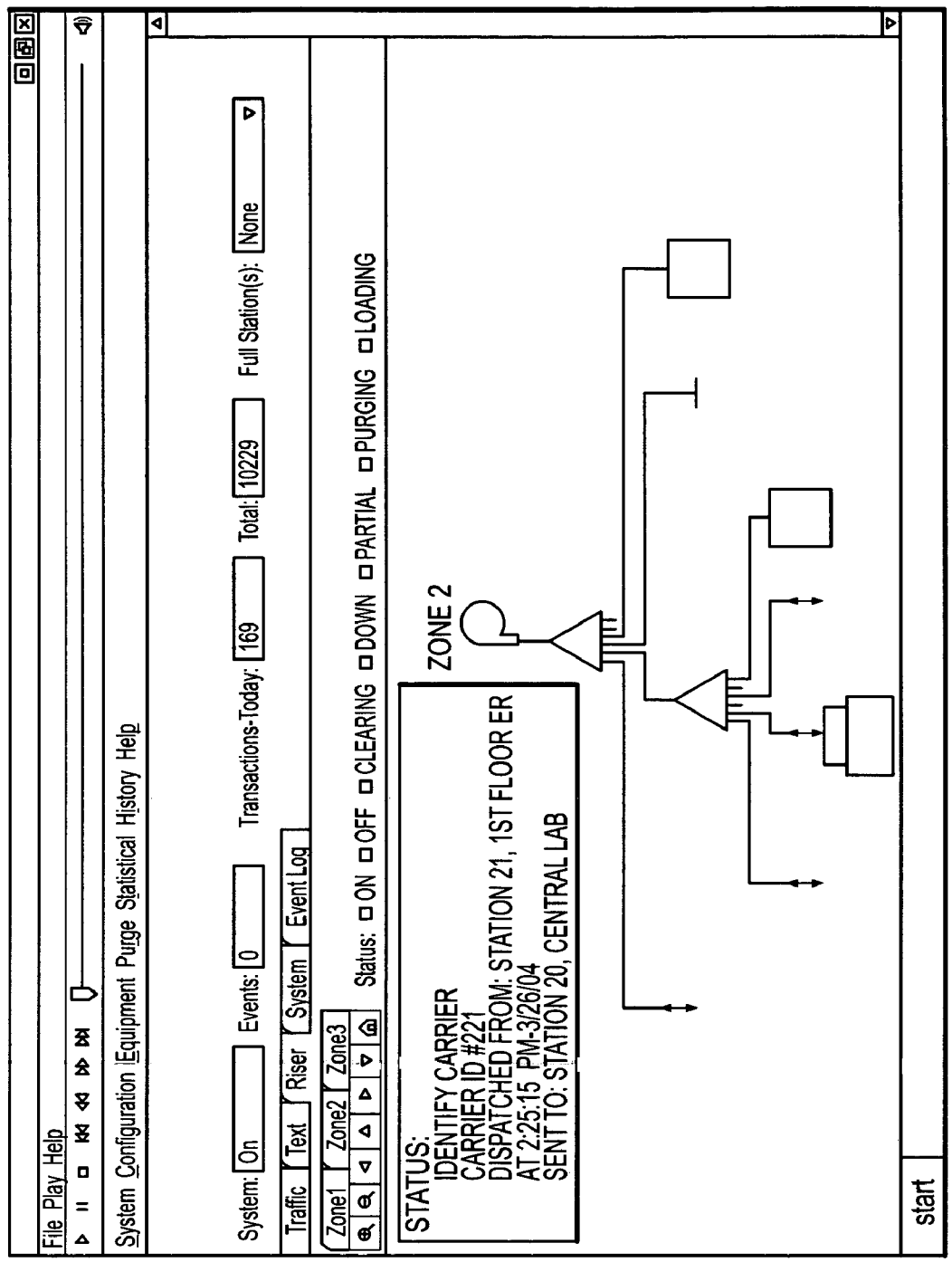
FIG. 11 shows a second display of a graphical user interface.

FIGS. 10 and 11 show an alternate embodiment of a user interface 32 that may be utilized with the user stations 16, 18 and/or in stand-alone user interfaces 32. In particular, FIGS. 10 and 11 show a graphical user interface 132 that may be utilized in conjunction with a personal computer or other display device. For instance, such a graphical user interface 132 may be incorporated into the user stations 16, 18 and may further utilize a touch screen monitor to allow for selecting system transaction options. As shown, the graphical user interface 132 may provide a graphical depiction of components within the system 10. That is, the interface provides visual indicia, for example, icons that relate to the system components and lay out of the system 10. For instance, the graphical user interface my provide visual indicia of the blower(s) 22, bypass transfer units 21, transfer units 20, user stations 18, etc. Furthermore, a position of a given carrier may be depicted on the graphical user interface 132. In this regard, a user may visually monitor the progress of a given transaction as a carrier 100 passes through the system 10. Accordingly, antennae devices/readers 40 may be incorporated throughout the system 10 for use in monitoring the progress of a given carrier transaction. The graphical user interface 132 may incorporate any of the functions discussed above in regard to the user-interface of FIGS. 7-9.

The graphical user interface 132 may further include a number of tabs 134 and/or pull down menus to allow a user to access different functions. For instance, by selecting the event log tab 134A, a user may access transaction histories for an identified station 16, 18 and/or carrier 100. It will be appreciated that the user station 16, 18 may be selected via the graphical user interface 132 (e.g., utilizing a mouse or touch screen system). Furthermore, it will be noted that a transaction record similar to that shown in FIGS. 8 and 9 may be overlaid onto a portion of the graphical user interface 132 for monitoring purposes.

As shown in FIG. 10, the system tab 134B is selected such that the configuration of the entire system 10 is provided on the graphical user interface 132. Referring to FIG. 11, it will be noted that the riser tab 134C is selected such that a single zone may be shown. Of course, variations may be made as deemed fit by a user and/or system administrator.

Referring again to FIG. 10, it will be noted that the graphical user interface 132 allows for showing the status 136 of various sections of the system 10. In this regard, by utilizing shading and/or color-coding, the status of various components within the system 10 may be visually indicated. For instance, if a user station is signed off (i.e., inactive), the graphical depiction on the graphical user interface may indicate that the particular user station 16, 18 is inactive by showing the station in a predetermined "inactive color," or, by not displaying the inactive station. Further, if certain portions of the system 10 are clearing, down, partially active, purging carriers and/or loading carriers, appropriate visual indications may be provided on the screen.

The use of a graphical user interface 132 provides an intuitive interface for users of the system. Furthermore, the graphical user interface 132 in conjunction with the ID chips 29 on the carriers allows for a system administrator to monitor all carrier traffic currently within the system and/or located at user station 16, 18 (e.g., awaiting processing).

Further, the system 10 described herein is also employable for identifying carriers in case of non-typical circumstances. Some of the non-typical circumstances will be described in greater detail below.

Figure 12A:
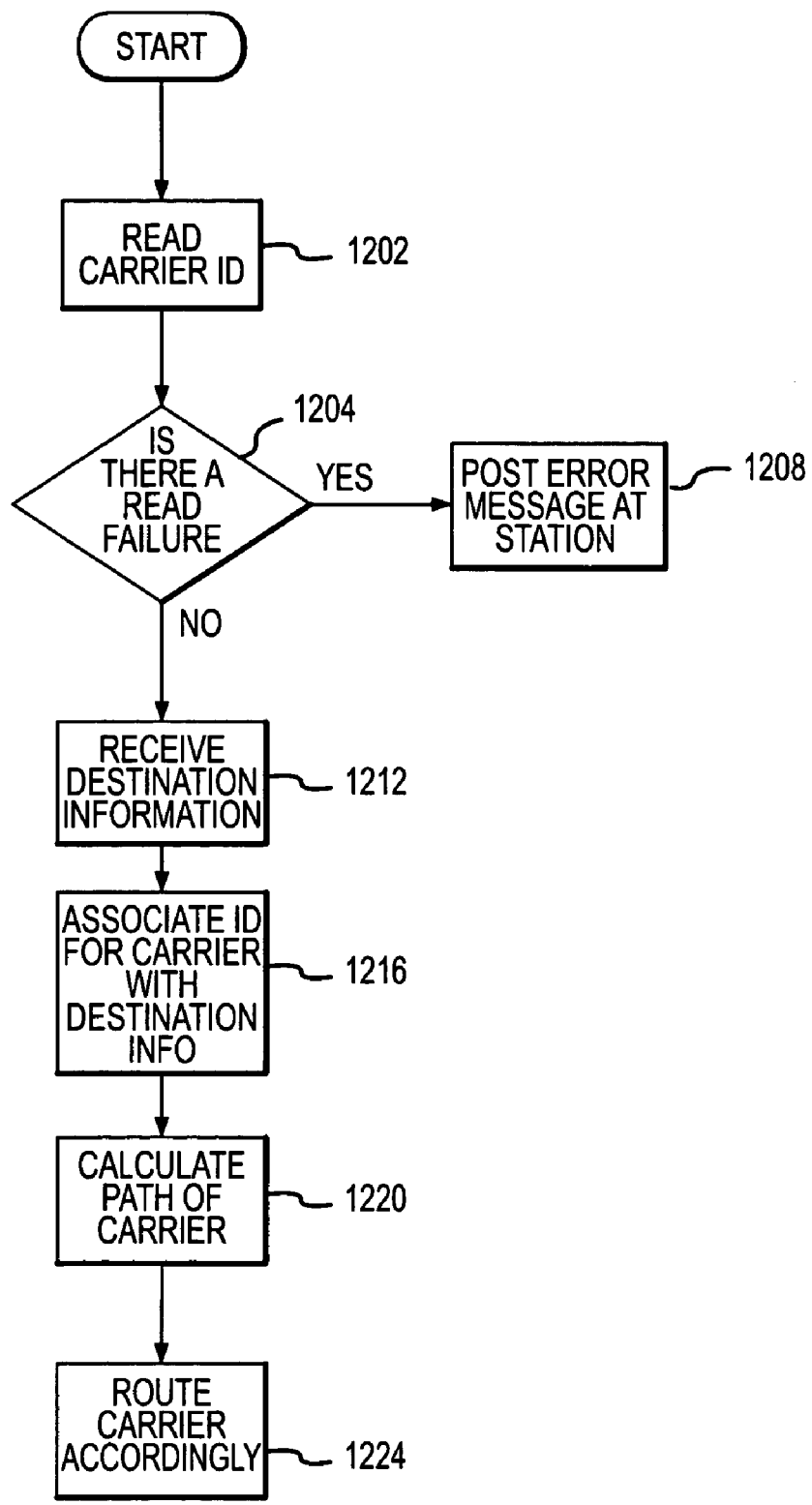
FIGS. 12a and b disclose flow charts which describe the typical operation of the pneumatic carrier system with RFID capability.

Disclosed in FIGS. 12a and b are flowcharts which describe the typical operation of the system when a carrier 100 is put in the system 10 at a station 16, 18 and a destination location is selected. As a first step of the process (1200), the system will read (1202) carrier information (e.g., identification) off the ID chip 29 incorporated into the carrier 100. If there is a read failure at this point, that is, if ID information cannot be read (1204) from the ID chip 29, an error message will be posted (1208) on the display 110 at the station 16, 18. If an ID is read, the destination information entered by a system user at the station 16, 18 is received (1212) and employed to create a transaction which is then associated (1216) with the carrier ID for the particular carrier 100. This transaction may then be stored in the transaction archive 33 for future access. The SCC 30 will then calculate (1220) a path through the system 10 for the carrier 10 based on the destination information. The carrier 10 is then routed (1224) through the system 10 accordingly.

One purpose of the present invention is to reduce the potential for misdirected carriers 100 in the system 10. Many systems include multiple carrier lines and have generally higher overall traffic levels and as such, the incidence of a "floater" (i.e., an out of sync carrier) will greatly disrupt the typically first-in-first-out (FIFO) processing of transactions. As such, as a carrier 100 is routed through the system 10 in typical operations, an ID chip 29 may be read and analyzed at multiple locations in the system 10 to verify that the intended destination of the carrier 100 (the destination where the SCC will send carrier based on FIFO) is the same as the destination for the transaction associated with the carrier ID.

Figure 12B:
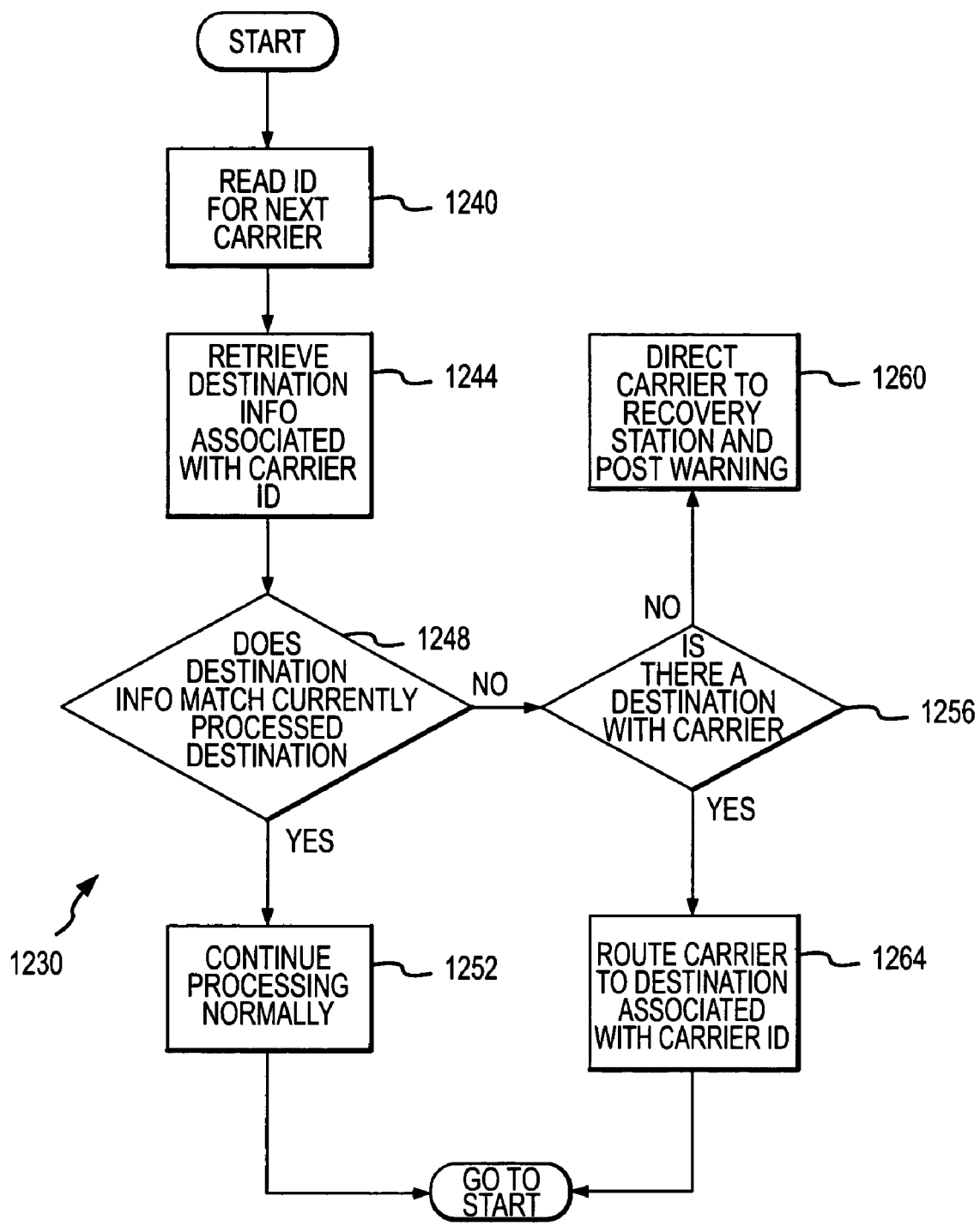

The process (1230) performed by the system 10 during the routing and monitoring of the carrier 100 through the system 10 are described in the flowchart of FIG. 12b. As was mentioned above, antenna devices/readers 40 are located throughout the system in such locations as the MTUs and TCUs, and are employed to monitor the carriers 100. At each of the locations, the antenna devices/readers 40 read the ID information of the ID chips 29 and provide this to the SCC 30. Upon reading (1240) an ID chip 29 for a particular carrier 100 to obtain a particular carrier ID, transaction information for the particular carrier ID will then be retrieved (1244). The destination associated with the transaction information for the carrier 100 will be compared (1248) against the location of the carrier 100. Every time the carrier ID is read at a location within the system 100, a determination is made as to whether the particular carrier 100 matches the destination for the transaction currently being processed. For a match, the system processes the carrier 100 in a normal fashion (1252).

If the carrier ID does not match the destination information of the transaction being processed, a further query is made as to whether there is destination information stored in memory which is associated with the particular carrier ID (1256). If there is not any destination information associated with the particular carrier ID, the carrier 100 is then routed to a recovery station and a warning is posted (1260). If there is a destination associated with the carrier ID, the SCC 30 adjusts its traffic pattern and routes the carrier 100 accordingly (1264). At that point, the antenna device/reader 40 at the location is ready to process the next carrier 100.

Traditional pneumatic carrier systems can have a maximum number of carriers in transit of approximately 1 carrier per zone plus the number of inter-zone storage lines. The system 10 described in FIG. 1 may have a maximum number of carriers in transit approximately equal to the number of parking spaces (TCU slots) in addition to the pressure/vacuum transactions. During operation of a pneumatic carrier system, the system 10 may experience an urgent off or a power loss. In the event of an urgent off or a loss of system power the traffic pattern information may be lost and as such the carriers 100 within the system 10 need to be identified and re-routed to their intended destination. The carrier ID antenna devices/readers 40 are employable to obtain identification information for each of the carriers 100 in the system 10.

Figure 13A:
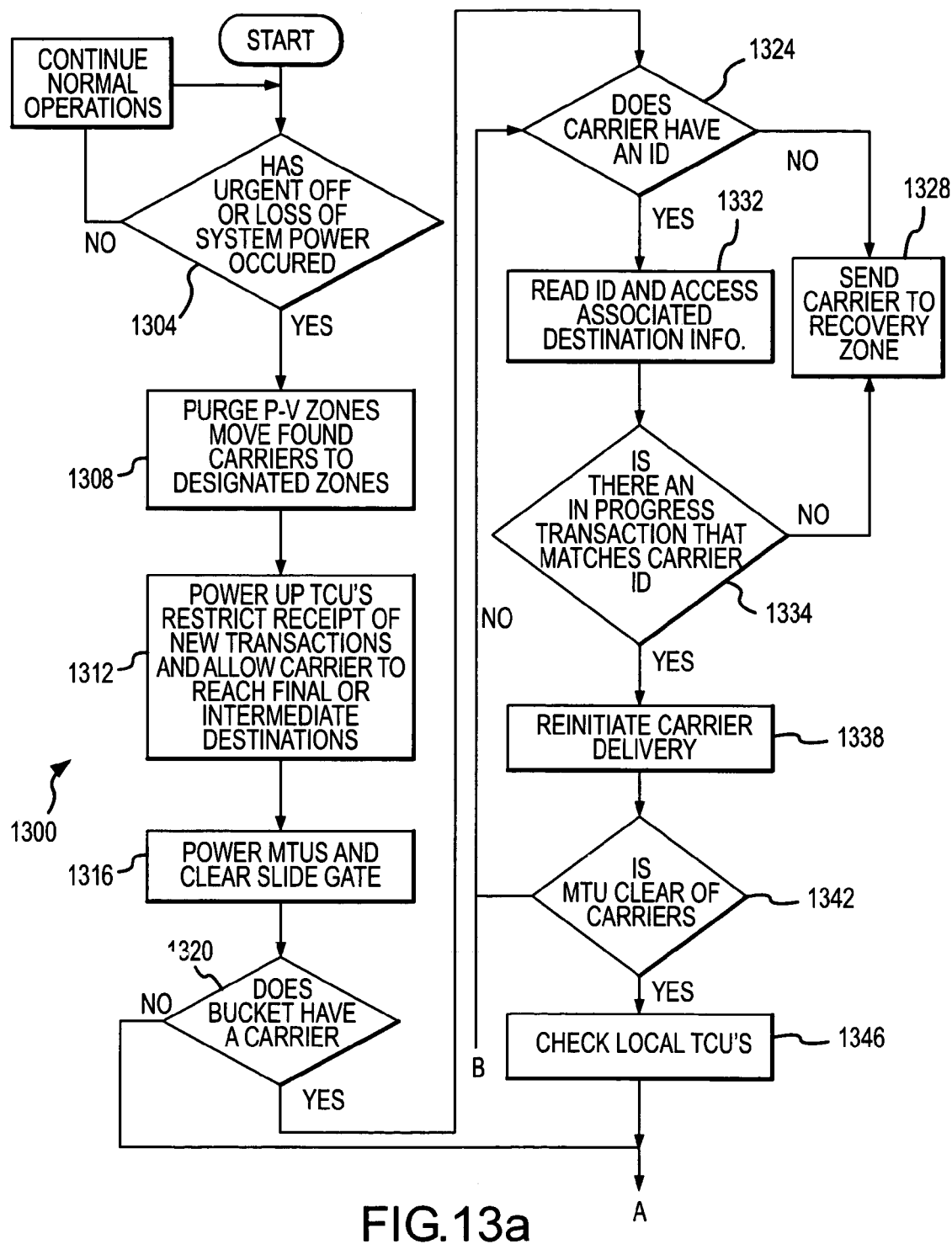
FIGS. 13a and b disclose flow charts which describe the operation of the pneumatic carrier system with RFID capability after an urgent off or loss of power.
Figure 13B:
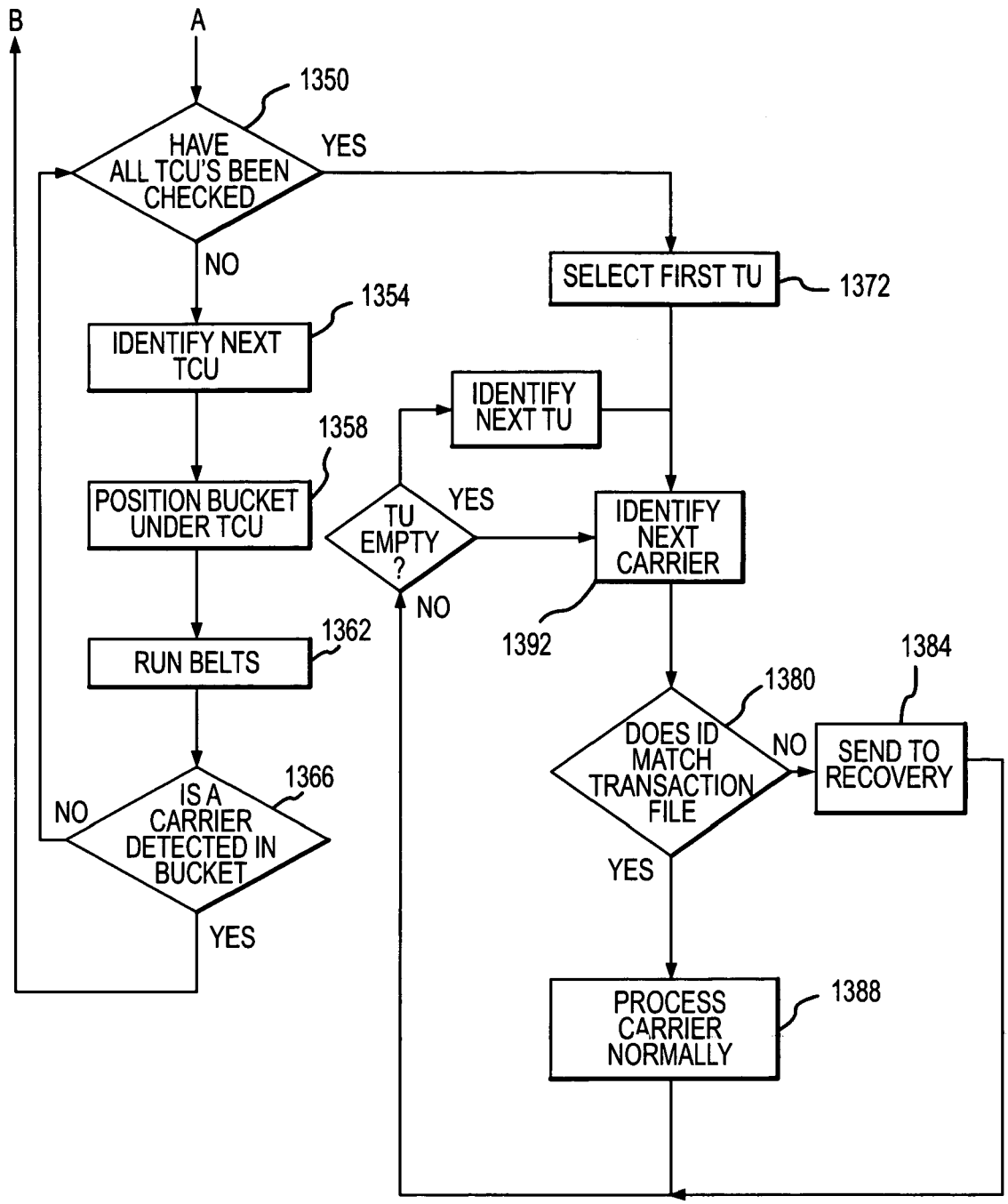

Disclosed in FIGS. 13a and b is a flowchart which describes in detail the process (1300) performed by the system 10 after an urgent off or a loss of power. Initially, the system 10 will detect (1304) that an urgent off or a power loss has occurred. At this point, the pressure/vacuum (P-V) zones will be purged and carriers found within the system will be moved (1308) to designated zones or to the nearest station for identification and redirection. The TCUs 14 may then be powered/vacuumed to allow carriers therein to reach a final or intermediate destination (1312). At this point, the slide gates of the MTUs 12 may be cleared (1316) and the bucket 72 may be checked (1320) for a carrier 100. If a carrier 100 is detected in the bucket 72, the carrier ID is read (1324). If no ID is read, the carrier 100 is sent (1328) to a recovery zone. A warning or alarm is posted by the SCC 30 indicating that this has been done.

If the carrier ID is read (1324), the SCC 30 attempts accesses (1332) the achieve 33 and attempts to match the carrier ID with a particular transaction in the archive 33. The SCC determines (1334) if there is an in progress transaction associated with the carrier ID. If there is no in progress transaction associated with the carrier ID, the carrier is sent (1328) to the designated MTU recovery zone. A warning or alarm may be posted indicating a transaction has been sent to the recovery zone. If there is an active transaction in progress that matches the carrier ID, the transaction is reinitiated (1338) and the carrier 100 is processed normally to its destination. The transaction may then be noted in an archive as being recovered.

When the 12 MTU is determined (1342) to be clear of carriers 100, each TCU 14 above each MTU 12 is checked (1346) for carriers 100. In this regard, the TCU's 14 may be checked sequentially until all TCU's 14 have been checked (1350). More particularly, each TCU 14 is identified in a predetermined order (1354) and checked for carriers 100. This may be accomplished by positioning (1358) the bucket 72 of the corresponding MTU 12 under the currently active TCU 14 and confirming that all slide gate and gripper assemblies in the TCU 14 are closed and then running (1362) the transfer belt in the TCU 14 for a designated in period of time sufficient to clear the TCU 14 of carriers(s). In this regard, the bucket 72 of the MTU 12 is monitored (1366) to detect a carrier that may be received from the TCU 14. If a carrier 100 is detected in the bucket 72, as was discussed above, the SCC 30 attempts to read (1324) the carrier ID, and then based on the success of the reading and the location of any associated transaction information in the archive 33, either reinitiates deliver (1338) of the carrier 100 to its selected destination or sends (1328) the carrier 100 to a designated recovery zone.

If no carrier 100 is detected in the bucket 72 after the belt running period, the SCC 30 then cycles through all the TCU's 14 above the MTU 12. After each TCU 14 has been verified empty, each bi-pass transfer unit 21 and transfer unit 20 above the MTU 12 are checked sequentially for the number of carriers 100 present, if any. In this regard, a first transfer unit 20 is selected (1372) and a reader is utilized to read (1392) an ID chip of a carrier in the transfer unit 20, if a carrier is present. If no carrier is present, the next transfer unit 20 is selected. If a carrier is present, the carrier ID of the carrier 100 compared with transaction files. If the carrier ID does not match a transaction file (1380), the carrier 100 is processed into the MTU and sent (1384) to the MTU recovery station. A warning may then be posted by the SCC indicating a transaction has been sent to the recovery station.

If there is a transaction in the process transaction file that matches the carrier ID, the transaction is reinitiated and the carrier is processed (1388) normally to its destination. The transaction is noted in the archive as being recovered. Each TCU is then directed to identify (1392) any remaining carriers, one carrier at a time. The above-described steps are repeated until all the staged carriers have been processed (i.e., sent to the MTU recovery station or sent to the intended destination). After all the staged transactions have been processed, the system is available to process transactions normally.

Another feature which may be incorporated in the system described herein is the means to accurately segregate general use and special use carriers without human intervention. In some systems it is desirable to limit the distribution of biohazards and carriers that had previously transported biohazards. General use carriers may be defined as those carriers that are used to transport only non-biohazard material while special use carriers may be defined as those characters that are used to transport only biohazards. For example, general areas such as pharmacy and administration may use general use carriers while laboratory related areas utilize only the special use carriers. Nursing areas may utilize a mix of general use and special use carriers.

In order to implement such system, it may be required that the carrier ID be read at each station 16, 18, at each TCU 14 and at the MTU bucket 72. Every carrier 100 must also be equipped with a carrier ID. Prior to start up or implementation of this capability, every carrier 100 must be identified to the SCC has either general use or special use. Additionally, every carrier must be physically identified as general use or special use. As new carriers are introduced into the system 10 there should be some maintenance function that allows a carrier to be identified as general use or special use.

Figure 14:
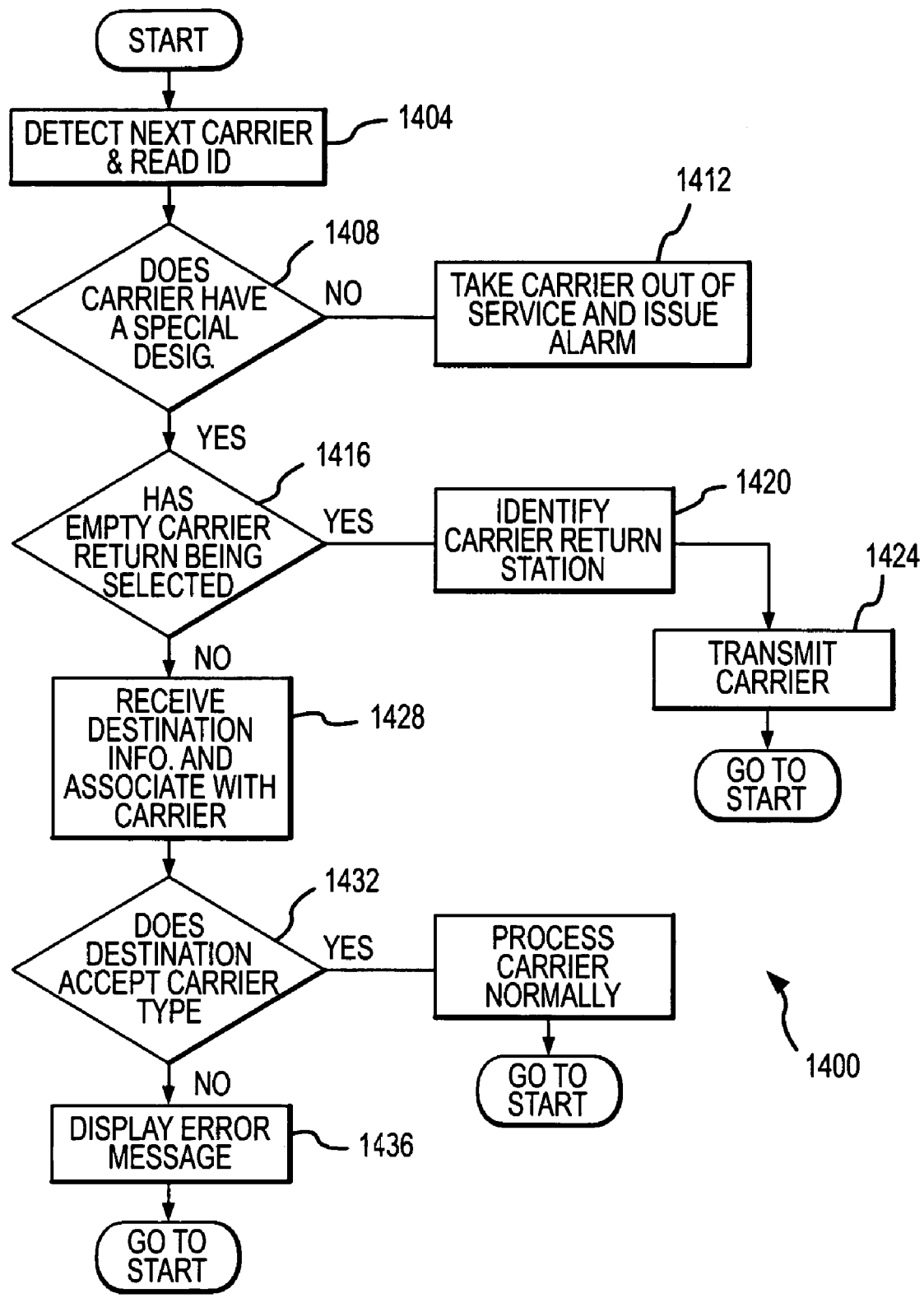
FIG. 14 discloses a flow chart which describes the operation of the pneumatic carrier system with RFID capability for identifying and routing clean and dirty carriers.

A process (1400) for controlling the routing of general use and special use carriers is described in the flowchart of FIG. 14. In operation, a carrier 100 is initially inserted into a dispatcher 60 of a station 16, 18. At this point the carrier ID is read (1404) at the station 16, 18 and identified (1408) as either general use or special use. If no carrier ID is read the transaction is not allowed and a message posted at the origin station 16, 18 indicating that the carrier 100 does not include an ID and must be taken out of service (1412). Further, an alarm may also be provided to the SCC (1412).

If the carrier 100 does have an ID and an empty carrier return function is selected (1416) by a user, the carrier 100 may be identified as general use or special use. Then a destination may be identified (1420) based on the need for that carrier type at a particular station 16, 18. The SCC may then transmit (1424) the carrier to the identified station 16, 18.

If it is determined that the carrier 100 does include an ID and the empty carrier return function is not selected, a destination may then be received through the user interface 32 and associated (1428) with the carrier ID. At this point, the SCC 30 may make the determination (1432) as to whether the destination accepts general use and/or special use carriers. It is possible that a particular destination may accept both types of carriers. If the carrier type is not allowed at the destination chosen, the transaction is disallowed and a message is posted (1436) at the origin station 16, 18 which states "destination station does not accept general use/special use carriers." If the carrier type is allowed at the selected destination station 16, 18, the SCC 30 processed the carrier 100 normally (1440).

Another process performed by the system described herein is the verification of the successful completion of the transaction without human intervention. Additional capabilities include the SCC 30 flagging carriers 100 that did not arrive at their correct destination so that the SCC 30 will better assist maintenance personnel to ascertain the intended destination of carriers 100 after a system purge. This particular process also provides documentation and error reporting.

Figure 15:
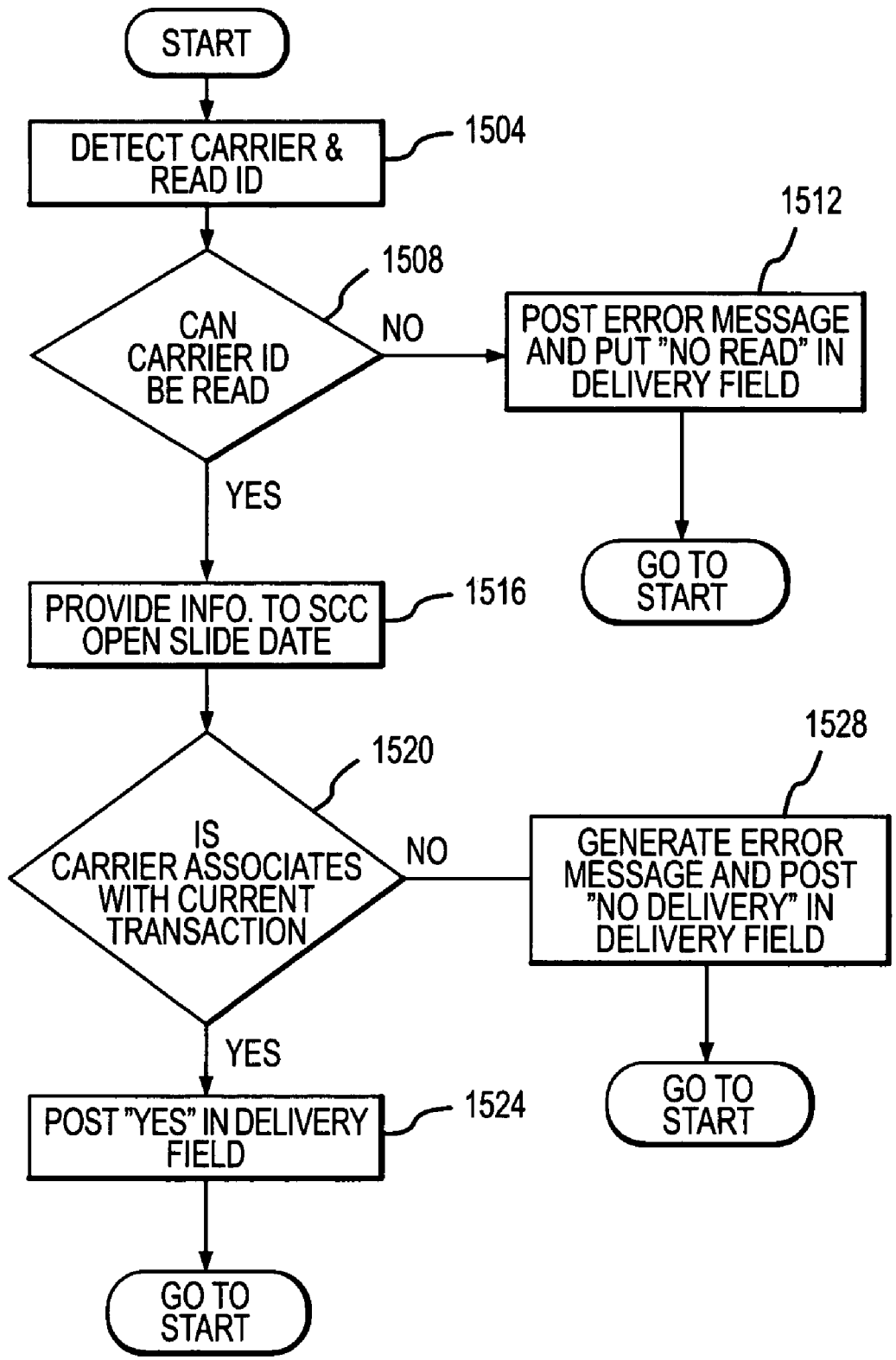
FIG. 15 discloses a flow chart which describes the operation of the pneumatic carrier system with RFID capability for confirming the receipt of carriers at destination locations.

A flow chart describing the steps performed in the flagging process (1500) is provided in FIG. 15. The flagging process (1500) will require that the carrier ID be read at the dispatch and destination station, as well as at each TCU 14 and at the MTU bucket 72. Additionally, every carrier 100 in the system must be equipped with the carrier ID chip 29. Still further, the SCC transaction archive 33 must be modified to include a delivery confirmation field. Possible entries in this field may include: "N/A" indicates carrier ID has not been implemented on the system, "Yes" indicates a delivery of the carrier has been confirmed by validating the carrier ID at the destination station, "No" indicate the carrier ID at the destination station did not match the carrier ID associated with the transaction, and "No Read" indicates the station was unable to determine the carrier ID associated with the transaction delivered to the destination station.

In operation, a carrier 100 will initially arrive at a slide plate above a station 16, 18 and set a sensor. At this point an attempt is made to read (1504) the carrier ID. A determination is made as to if the carrier ID can be read (1508). If no carrier ID is read after a certain amount of time, the slide plate is directed to open. The destination station will confirm to the SCC 30 the "No Read" and an alarm warning is posted (1512) at the SCC 30. At this point the "No Read" is posted in the transaction delivery confirmation field. If the carrier ID is read, the slide plate is directed to open and the stations 16, 18 provide (1516) the SCC 30 with the carrier ID.

However, in situations where security information is associated with a transaction, this security information may have to be entered at the destination in order for the carrier 100 to be released.

At this point the SCC 30 attempts to verify (1520) the carrier ID with the carrier ID associated with the transaction expected to be at the destination station 16, 18. If the carrier ID's match a "Yes" is posted (1524) in the transaction delivery confirmation field. If the carrier ID's do not match an alarm may be initiated at the SCC 30, origin station and/or the destination station. Further, a "No Delivery" is posted (1528) in the transaction delivery confirmation field. At this point the station is then able to receive the next carrier.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for maintaining an inventory of carriers across a plurality of carrier stations in a pneumatic carrier system comprising the steps of:
   using a communication device, reading carrier identification information from an identification device of a pneumatic carrier that is dispatched by one of a plurality of carrier stations within the pneumatic carrier system;
   receiving the carrier identification from the communication device at a controller, wherein the controller is operative to:
   use the carrier identification information for updating a carrier station inventory record associated with a quantity of pneumatic carriers located at one of the carrier station; and
   based on the updated carrier station inventory record, directing at least one empty pneumatic carrier to the carrier station when, consequent to said dispatching, said quantity of pneumatic carriers is less than a predetermined inventory of pneumatic carriers.

2. The method of claim 1, wherein the step of reading comprises reading a radio frequency identification device (RFID).

3. The method of claim 1, wherein updating said carrier station inventory record further comprises one of:
   removing the pneumatic carrier from an inventory record of a first of the plurality of carrier stations; and
   adding the pneumatic carrier to an inventory record of a second of the plurality of carrier stations.

4. The method of claim 1, wherein the step of directing comprises sending a message to one of the plurality of carrier stations having an excess quantity of carriers.

5. The method of claim 4, wherein the message requests at least one carrier be returned to the pneumatic carrier system.

6. The method of claim 5, wherein upon the at least one carrier being returned to the pneumatic carrier system, the empty carrier is automatically directed to the carrier station having less than a predetermined inventory of pneumatic carriers.

7. The method of claim 1, wherein the step of directing comprises directing the at least one pneumatic carrier from a supply of pneumatic carriers.

8. The method of claim 1, wherein the pneumatic carrier system includes at least two types of pneumatic carriers and reading carrier identification information further comprises:

determining a carrier type for the pneumatic carrier.

9. The method of claim 8, wherein the step of directing at least one pneumatic carrier further comprises:

directing at least one carrier having a carrier type compatible with the carrier station having less than a predetermined inventory of pneumatic carriers.

* * * * *

UNITED STATES PATENT AND TRADEMARK OFFICE
CERTIFICATE OF CORRECTION

| | | |
|---|---|---|
| PATENT NO. | : 7,243,002 B1 | Page 1 of 1 |
| APPLICATION NO. | : 10/991303 | |
| DATED | : July 10, 2007 | |
| INVENTOR(S) | : Hoganson et al. | |

It is certified that error appears in the above-identified patent and that said Letters Patent is hereby corrected as shown below:

On the Title page, after "Item (22), Filed: Nov. 17, 2004", insert -- Related U.S. Application Data Item (60) Provisional application No. 60/556,819, filed on March 27, 2004 --.

Signed and Sealed this

Twenty-fifth Day of January, 2011

David J. Kappos
*Director of the United States Patent and Trademark Office*

(12) EX PARTE REEXAMINATION CERTIFICATE (8184th)
United States Patent
Hoganson et al.

(10) Number: US 7,243,002 C1
(45) Certificate Issued: Apr. 26, 2011

(54) SYSTEM AND METHOD FOR CARRIER IDENTIFICATION IN A PNEUMATIC TUBE SYSTEM

(75) Inventors: Kenneth Michael Hoganson, Aurora, CO (US); Gregory Richard Chaney, Centennial, CO (US); Bennett Charles Hinnen, Arvada, CO (US)

(73) Assignee: Translogic Corporation, Denver, CO (US)

Reexamination Request:
No. 90/009,675, Mar. 29, 2010

Reexamination Certificate for:
Patent No.: 7,243,002
Issued: Jul. 10, 2007
Appl. No.: 10/991,303
Filed: Nov. 17, 2004

Certificate of Correction issued Jan. 25, 2011.

Related U.S. Application Data
(60) Provisional application No. 60/556,819, filed on Mar. 27, 2004.

(51) Int. Cl.
G06F 7/00 (2006.01)

(52) U.S. Cl. .............................. 700/215; 406/4; 700/230
(58) Field of Classification Search .................. None
See application file for complete search history.

(56) References Cited

U.S. PATENT DOCUMENTS

| | | | |
|---|---|---|---|
| 2,679,990 A | 6/1954 | Mathzeit et al. |
| 2,710,728 A | 6/1955 | Halpern |
| 2,865,578 A | 12/1958 | Hennessy |
| 2,893,660 A | 7/1959 | Cook et al. |
| 3,148,845 A | 9/1964 | Buchwald et al. |
| 3,236,475 A | 2/1966 | Mach et al. |
| 3,265,325 A | 8/1966 | Buchwald et al. |
| 3,408,113 A | 10/1968 | Bouladon |
| 3,627,231 A | 12/1971 | Kalthoff |
| 3,711,038 A | 1/1973 | Otteren |
| 3,817,476 A | 6/1974 | Martin |
| 3,829,042 A | 8/1974 | Torochkov et al. |
| 3,892,372 A | 7/1975 | Hauber |
| 3,951,461 A | 4/1976 | De Feudis |
| 4,037,805 A | 7/1977 | Alexandrov et al. |
| 4,058,274 A | 11/1977 | Hochradel et al. |
| 4,084,770 A | 4/1978 | Warmann |
| 4,256,418 A | 3/1981 | Stangl |
| 4,354,775 A | 10/1982 | Jalas |
| 4,395,164 A | 7/1983 | Beltrop et al. |
| 4,437,797 A | 3/1984 | Kardinal |
| 4,509,123 A | 4/1985 | Vereen |
| 4,516,888 A | 5/1985 | Kardinal |
| 4,563,112 A | 1/1986 | Mokuya et al. |
| 4,766,547 A | 8/1988 | Modery et al. |
| 4,971,481 A | 11/1990 | Foreman |
| 5,038,290 A | 8/1991 | Minami |
| 5,153,842 A | 10/1992 | Dlugos, Sr. et al. |
| 5,165,826 A | 11/1992 | Egbert |
| 5,225,990 A | 7/1993 | Bunce et al. |
| 5,237,931 A | 8/1993 | Riedl |
| 5,267,173 A | 11/1993 | Tanizawa et al. |
| 5,375,691 A | 12/1994 | Wirtz |
| 5,562,367 A | 10/1996 | Scott |
| 5,682,820 A | 11/1997 | Arata |

(Continued)

Primary Examiner—William C Doerrler

(57) ABSTRACT

A system and method provides for the identification and monitoring of carriers within a pneumatic carrier system. Each carrier which is to be employed within the system includes an identification device such as a radio frequency identification (RFID) chip which has stored thereon identification information for the carrier. Positioned throughout the system are communications devices such as antennas and readers which are employed to read and/or write identification information on the chip. When a carrier is put in the system, a destination location can be associated with the particular carrier ID. This associated information is then employed to, among many things, monitor and confirm identity of the carrier as it moves to its destination.

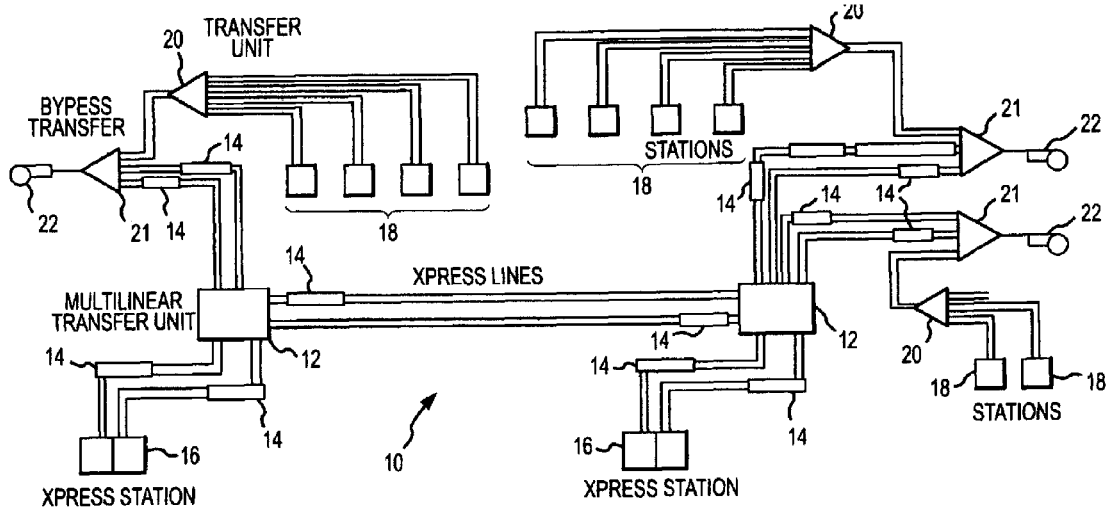

U.S. PATENT DOCUMENTS

| | | |
|---|---|---|
| 5,735,644 A | 4/1998 | Grosswiller et al. |
| 5,867,388 A | 2/1999 | Okumura et al. |
| 5,959,568 A | 9/1999 | Woolley |
| 5,966,309 A | 10/1999 | O'Bryan et al. |
| 6,030,152 A | 2/2000 | Steele |
| 6,068,428 A | 5/2000 | Nair et al. |
| 6,138,058 A | 10/2000 | Van Antwerp, Jr. et al. |
| 6,146,057 A | 11/2000 | Gromley et al. |
| 6,173,212 B1 | 1/2001 | Valerino, Sr. |
| 6,202,004 B1 | 3/2001 | Valerino, Sr. |
| 6,292,710 B1 | 9/2001 | Bonnet |
| 6,437,272 B2 | 8/2002 | Tamamoto et al. |
| 6,477,442 B1 | 11/2002 | Valerino, Sr. |
| 6,516,239 B1 | 2/2003 | Madden et al. |
| 6,539,360 B1 | 3/2003 | Kadaba |
| 6,600,418 B2 | 7/2003 | Francis et al. |
| 6,659,693 B1 | 12/2003 | Perkins et al. |
| 6,665,586 B1 | 12/2003 | Ball et al. |
| 6,672,808 B1 | 1/2004 | McIntyre et al. |
| 6,702,150 B2 | 3/2004 | Sumetzberger |
| 6,711,463 B2 | 3/2004 | Tozuka et al. |
| 6,747,560 B2 | 6/2004 | Stevens, III |
| 6,762,382 B1 | 7/2004 | Danelski |
| 6,878,896 B2 | 4/2005 | Braginsky et al. |
| 6,887,358 B2 | 5/2005 | Elger |
| 6,911,910 B2 | 6/2005 | Sansone et al. |
| 6,939,088 B2 | 9/2005 | Farrell |
| 6,950,724 B2 | 9/2005 | Mileaf et al. |
| 6,959,229 B2 | 10/2005 | Eidemiller |
| 7,079,913 B2 | 7/2006 | Kato et al. |
| 7,092,788 B2 | 8/2006 | Brixius et al. |
| 7,104,734 B2 | 9/2006 | Smith et al. |
| 7,151,980 B2 | 12/2006 | You et al. |
| 7,196,627 B2 | 3/2007 | Rommelmann et al. |
| 2001/0056311 A1 | 12/2001 | Valerino, Sr. |

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

1. A method of maintaining an inventory of carriers across a plurality of carrier stations in a pneumatic carrier system comprising the steps of:

using a communication device, reading carrier identification information from an identification device of a pneumatic carrier that is dispatched by *any* one of a plurality of carrier stations within the pneumatic carrier system;

receiving the carrier identification from the communication device at a controller, wherein the controller is operative to:

use the carrier identification information for updating [a] *one of a plurality of* carrier station inventory [record] *records* associated with a quantity of pneumatic carriers located at one of the *plurality of* carrier [station] *stations*; and based on the *one* updated carrier station inventory record, directing at least one empty pneumatic carrier to the carrier station *associated with the one updated carrier station inventory record* when, consequent to said dispatching, said quantity of pneumatic carriers is less than a predetermined inventory of pneumatic carriers.

\* \* \* \* \*